United States Patent [19]
Flockencier

[11] Patent Number: 6,115,113
[45] Date of Patent: Sep. 5, 2000

[54] METHOD FOR INCREASING SINGLE-PULSE RANGE RESOLUTION

[75] Inventor: Stuart W. Flockencier, Cedar Hill, Tex.

[73] Assignee: Lockheed Martin Corporation, Grand Prairie, Tex.

[21] Appl. No.: 09/204,413

[22] Filed: Dec. 2, 1998

[51] Int. Cl.[7] .................................................. G01C 3/08
[52] U.S. Cl. ........................................................ 356/5.01
[58] Field of Search .................................. 356/5.01–5.08; 342/134, 135, 195–197, 202; 327/91; 375/343

[56] References Cited

U.S. PATENT DOCUMENTS

| | | | |
|---|---|---|---|
| 3,900,261 | 8/1975 | Wingate | 356/5 |
| 3,959,641 | 5/1976 | Miller, Jr. et al. | 235/181 |
| 4,770,526 | 9/1988 | Manhart et al. | 356/5 |
| 4,888,477 | 12/1989 | Nankivil | 250/201 |
| 5,110,203 | 5/1992 | MacCabee | 356/5 |
| 5,243,553 | 9/1993 | Flockencier | 356/5 |
| 5,357,331 | 10/1994 | Flockencier | 356/5 |
| 5,511,015 | 4/1996 | Flockencier | 364/728 |
| 5,745,442 | 4/1998 | Herscher | 368/118 |

*Primary Examiner*—Stephen C. Buczinski
*Attorney, Agent, or Firm*—Williams, Morgan & Amerson, P.C.

[57] ABSTRACT

A method and apparatus is provided for detecting a pulse in a signal. In one aspect of the invention, a method comprises digitizing the signal into a plurality of samples; repeatedly convolving each one of at least a portion of the buffered samples R times, wherein R>1; and detecting the received signal's center of energy from the convolution results. In a second aspect, an apparatus comprises a analog-to-digital converter capable of digitizing the received signal to produce a plurality of samples; a convolution circuit, including a matched filter for convolving the digitized signal at a second sampling rate; a buffer capable of storing the samples and serially outputting each of the samples R times, where R>1, to the convolution circuit; and a detector for detecting the digitized signal's center of energy from the output of the convolution circuit.

36 Claims, 21 Drawing Sheets

| $n$ | $Z_n$ |
|---|---|
| -1 | 0 |
| 0 | $A_0$ |
| 1 | $2A_0+A_1$ |
| 2 | $3A_0+2A_1+A_2$ |
| 3 | $2A_0+3A_1+2A_2+A_3$ |
| 4 | $A_0+2A_1+3A_2+2A_3+A_4$ |
| 5 | $A_1+2A_2+3A_3+2A_4+A_5$ |
| 6 | $A_2+2A_3+3A_4+2A_5+A_6$ |
| ⋮ | ⋮ |
FIG. 11
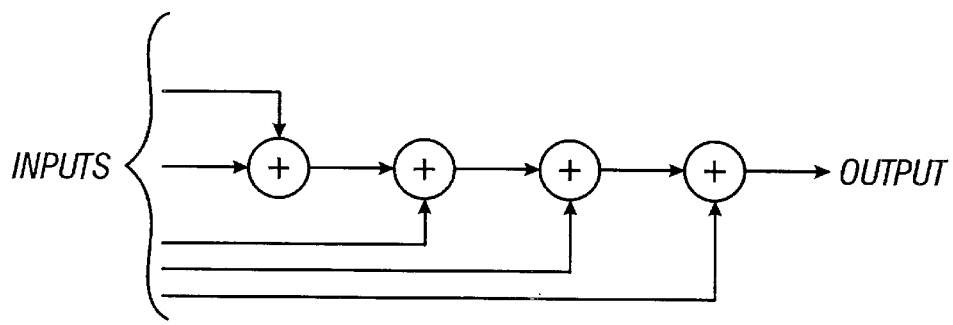
FIG. 12
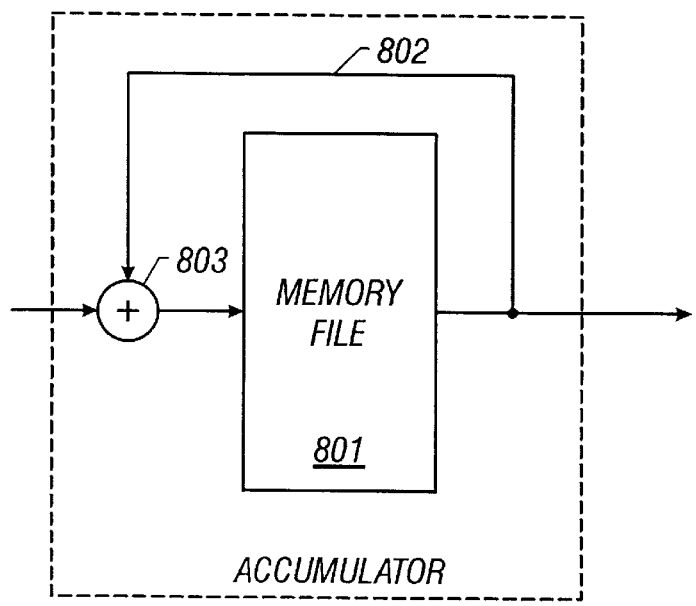
FIG. 27

| n | $B_n$ | $C_n = \Sigma B_n$ | $Z_n = \Sigma C_n$ |
|---|---|---|---|
| -1 | 0 | 0 | 0 |
| 0 | $A_0$ | $A_0$ | $A_0$ |
| 1 | $A_1$ | $A_0 + A_1$ | $2A_0 + A_1$ |
| 2 | $A_2$ | $A_0 + A_1 + A_2$ | $3A_0 + 2A_1 + A_2$ |
| 3 | $A_3 - 2A_0$ | $A_0 + A_1 + A_2 + A_3$ | $2A_0 + 3A_1 + 2A_2 + A_3$ |
| 4 | $A_4 - 2A_1$ | $-A_0 + A_1 + A_2 + A_3 + A_4$ | $A_0 + 2A_1 + 3A_2 + 2A_3 + A_4$ |
| 5 | $A_5 - 2A_2$ | $-A_0 - A_1 + A_2 + A_3 + A_4 + A_5$ | $A_1 + 2A_2 + 3A_3 + 2A_4 + A_5$ |
| 6 | $A_6 - 2A_3$ | $-A_1 - A_2 - A_3 + A_4 + A_5 + A_6$ | $A_2 + 2A_3 + 3A_4 + 2A_5 + A_6$ |
| 7 | $A_7 - 2A_4$ | $-A_2 - A_3 - A_4 + A_5 + A_6 + A_7$ | $A_3 + 2A_4 + 3A_5 + 2A_6 + A_7$ |
| 8 | $A_8 - 2A_5$ | $-A_3 - A_4 - A_5 + A_6 + A_7 + A_8$ | $A_4 + 2A_5 + 3A_6 + 2A_7 + A_8$ |
| 9 | $A_9 - 2A_6$ | $-A_4 - A_5 - A_6 + A_7 + A_8 + A_9$ | $A_5 + 2A_6 + 3A_7 + 2A_8 + A_9$ |
| ... | ... | ... | ... |

FIG. 24

METHOD FOR INCREASING SINGLE-PULSE RANGE RESOLUTION

BACKGROUND OF THE INVENTION

1. Field of the Invention

This invention relates generally to processing information from a received signal and, more particularly, to increasing range resolution in a LADAR system.

2. Description of the Related Art

Once common application for laser technology is laser detecting and ranging (LADAR) systems. In LADAR systems, brief laser pulses are generated and transmitted via a scanning mechanism. Some of the transmitted pulses striking a target of interest are reflected back to a receiver associated with the transmitter. The time between the transmission of a laser pulse and the receipt of the reflected laser pulse ("return pulse") is used to calculate the "range" from the object that reflected the laser pulse to the object that receives the return pulse.

There are several types of known LADAR systems. In one type, electronic circuitry begins a ramp function concurrently with the transmission of the outgoing pulse. The ramp function halts when the return pulse is received. Thus, the height of the resulting ramp is directly proportional to the range to the target. In a second type, a counter starts when a laser pulse is transmitted and terminates the counter when the return pulse is detected. The value of the counter is thus proportional to the distance to the target. Both of these types suffer from threshold uncertainties and a variety of other problems. In response to these problems, a third type of LADAR system was developed. Exemplary of this third type of LADAR system is the one disclosed in my U.S. Pat. No. 5,357,331, entitled "System for Processing Reflected Energy Signals," and issued Oct. 18, 1994, to what is now Lockheed Martin Corporation as my assignee.

This particular LADAR system employs a digital filter, known as a finite impulse response ("FIR") filter, for signal correlation and signal convolution in the course of extracting range information from digital samples of the return pulse. Technically, the FIR filter is a discrete linear time-invariant system having an output based on the weighted summation of a finite number of past inputs. A FIR filter performs a convolution, or convolves, the digitized samples from the received pulse with another signal. In this case, FIR filter convolves the digitized samples with a signal embodying a set of predetermined coefficients expected to describe the return pulse. The coefficient signal, consequently known as a "template."

The result of the convolution is a measure of correlation between the reflected signal and the template. Correlation is a technique widely used to determine the similarity or dissimilarity between two signals. Two identical signals will have a maximum positive correlation; a signal will have a maximum negative correlation with its polar opposite; and a signal will have a zero or negligible correlation with a totally dissimilar function. The LADAR system can determine the time of the return pulse by determining which set of digitized samples have the highest correlation to the template. From the arrival time and the transmission time, the LADAR system then calculates the range.

Convolution, in the context discussed above, involves the physical manipulation of two signals to determine their similarity. Like many things in nature, the convolution can be mathematically described and, more particularly, can be described by Equation 1:

$$Cxy = (1/N) \sum_{K=0}^{N-1} [s(k)y(m-k)]$$

As reflected in Equation 1, the convolution requires N multiply-and-accumulate operations for each sample of Cxy (m), where N is the number of convolution points having a size dependent upon the duration of the two signals or their periodicity if they are periodic. The parameters "k" and "m" index the sample points of the respective input signals. Since correlation is a particular class of convolution, the same is true for correlation.

For real time applications in which signals are processed as they are received, data processing including convolutions must occur very quickly. More specifically, the system must perform the convolutions calculations fast enough to accommodate the Nyquist rate (over two times the bandwidth of the sampled signal). As stated above, each sample Cxy(m) requires N multiply-and-accumulate operations. This is because the summation must be calculated for every value of k, from (k=0) through (k=(N−1)). In a system designed to process signals having frequencies up to 50 MHz, for example, the sampling rate (Nyquist rate) must be at least 100 MHz (100 mega-samples/second) which corresponds to a period of 10 nsec. This means that the system has 10 nsec to accomplish N multiply-and-accumulate operations. If N is equal to ten (meaning that the filter function is ten samples wide) then each of the ten multiply-and-accumulate operations must be accomplished in 1 nsec. This would be a formidable task for even modern day electronics.

In designing LADAR systems, engineers are also typically concerned with increasing the resolution afforded by such systems. One way to increase range resolution is to increase the frequency of the LADAR pulses emitted by the system. In systems that utilize the time between LADAR pulses to analyze return pulses, increasing the frequency of the pulses requires that the analysis of the return pulses be conducted more quickly. Another way is to increase the sampling rate at which the, analog return pulse is digitized for processing. However, this technique is typically limited by hardware whose operational speed constrains the sampling rate. Further, both these approaches to increasing resolution increase the time pressure on performing the convolution, either by reducing the amount of time in which the given convolutions must take place or by increasing the amount of convolution that must occur in the given amount of time.

The present invention is directed to overcoming, or at least reducing the effects of, one or more of the problems set forth above.

SUMMARY OF THE INVENTION

A method and apparatus are provided for detecting a pulse in a signal. In one aspect of the invention, a method comprises digitizing the signal into a plurality of samples; repeatedly convolving each one of at least a portion of the buffered samples R times, wherein R>1; and detecting the signal's center of energy from the convolution results. In a second aspect, an apparatus comprises a analog-to-digital converter capable of digitizing the received signal to produce a plurality of samples; a convolution circuit, including a matched filter for convolving the digitized signal at a second sampling rate; a buffer capable of storing the samples and serially outputting each of the samples R times, where R>1, to the convolution circuit; and a detector for detecting the digitized signal's center of energy from the output of the convolution circuit.

BRIEF DESCRIPTION OF THE DRAWINGS

Other objects and advantages of the invention will become apparent upon reading the following detailed description and upon reference to the drawings in which:

FIGS. 10 and 11 comprise a block diagram and an input/output table, respectively, which illustrate a conventional high-speed circuit approach for convoluting the input signal of FIG. 1;

FIG. 12 shows 2-input adders.

FIG. 24 is a table illustrating the results of using the D-A circuit of FIG. 10;

FIG. 27 is a circuit diagram illustrating an implementation of one of the accumulators shown in FIG. 13.

Figure 1:
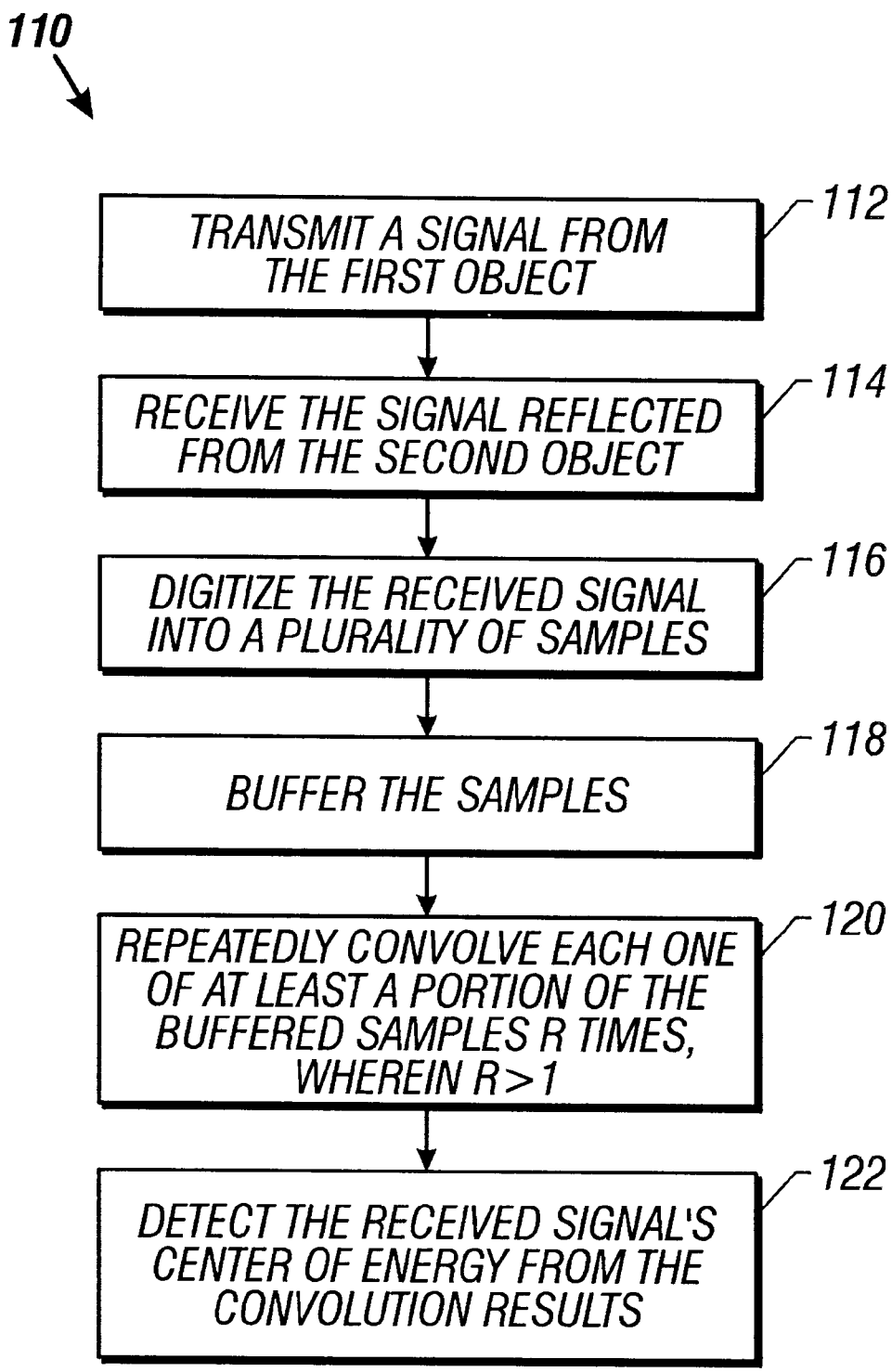
FIG. 1 illustrates a method practiced in accordance with an exemplary embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2:
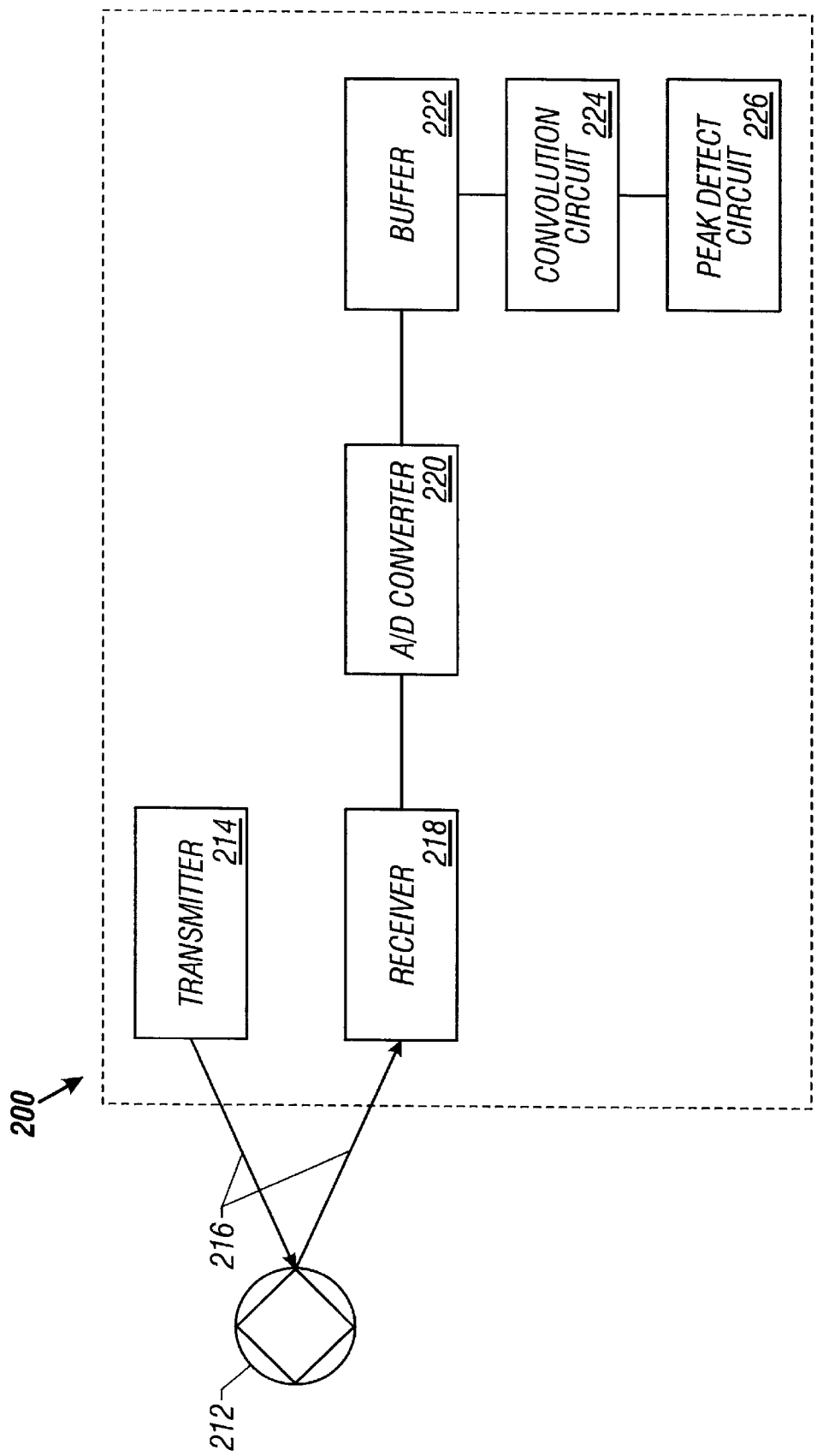
FIG. 2 illustrates an apparatus with which the method of FIG. 1 may be implemented in accordance with the exemplary embodiment of the present invention.

FIGS. 1 and 2 illustrate a method 110 and apparatus 200, respectively, of an exemplary embodiment of the present invention. The apparatus 200 senses, receives, and processes one or more energy pulses reflected from an object 212 to the receiver 218 of the apparatus 200 in accordance with the method 110. The transmitter 214 typically comprises a part of the apparatus 200 as shown in FIG. 2, but may be mounted on a separate platform in alternative embodiments. At a given time, the transmitter 214 transmits a signal, or energy pulse, 216 as set forth in the box 112 of FIG. 1. The apparatus 200 processes the energy pulse 216 to determine from the flight, or return, time, i.e., the time it takes the pulse 216 to travel from the object 212 to the receiver 218, the range from the apparatus 200 to the object 212. Thus, the transmitter 212, i.e., a first object, transmits a pulse 216 and the receiver 218 then receives the pulse 216 reflected from the object 212 as set forth in box 114 of FIG. 1.

The return energy pulse 216 received by the apparatus 200 is analog. Thus, a part of the signal processing performed by the apparatus 200 digitizes the return pulse 216 into a plurality of samples as set forth in box 116 of FIG. 1. By using digital analysis techniques, a more robust determination of range can be obtained under dynamic conditions than would be the case with the simpler analog ramp methods discussed above. Thus, returning to FIG. 2, the receiver 218 of the apparatus 200 outputs the analog return pulse to the analog-to-digital converter 220. The analog-to-digital converter 220 digitizes the analog return pulse into a plurality of digital samples. The analog-to-digital converter 220, in one embodiment, includes a sampler (not shown) and a quantizer (also not shown) to sample the analog return pulse and then convert the analog samples into digital samples. The analog return pulse is digitized by "sampling" it at a predetermined sampling rate bounded by the duration of and frequency of the return pulses. This sampling rate strongly influences the resolution of the range extracted from the return pulse as noted above.

The samples output by the analog-to-digital converter 220 are then stored in the buffer 222 as set forth in box 118 of FIG. 1. The buffer 222 may be any type of storage element to and from which digital data may be written and read, and will be implementation specific. Typically, the buffer 222 will be some form of computer readable, random access memory ("RAM"). However, in some alternative embodiments, the samples may be stored in an array of discrete storage elements, such as flip-flops, or in other types of storage devices, such as a hard disk, a floppy disk, or a magnetic tape.

After the incoming data stream is digitized and stored, a detailed analysis that utilizes many time samples is performed. More particularly, the buffered, digitized samples are convolved with a template. This analysis "slides" or "shifts" the template in discrete steps across the stored sequence of samples to find the best match. The location of this best match is proportional to the range of the return pulse while the strength of the match is related to its intensity. The template convolves many of the samples together to improve the signal to noise ratio and to find the return pulse's center of energy. Using this method, signal amplitude variations may be ignored. An appropriate template can also be used in some embodiments for second-pulse logic to extract secondary returns even if the later pulse is partially overlapped by a stronger primary return. Thus, the shape of the return pulse is compared to that of the transmitted pulse during processing to determine time of travel, to and from the object 212.

Returning now to FIG. 2, the convolution circuit 224 analyzes the samples and outputs the result of the analysis to the peak detect circuit 226. The convolution circuit 224 includes a matched filter (not shown). The matched filter may be any FIR filter known to the art. The matched filter is loaded with a set of coefficients representative of the expected shape of the return pulse. This set of coefficients defines the template discussed above. The convolution circuit 224 produces evaluation numbers indicative of the degree of correlation between the template and the return signal.

The design of convolution circuits is well-known in the art. Conventional convolution circuits feed the samples serially into the filter thereof, each sample being fed one at a time. In this conventional approach, the template is shifted across the stored sequence in discrete steps defined by the sampling rate at which the analog return pulse is digitized. Each discrete step is no wider or narrower than an individual sample and the resolution of any measurement obtained therefrom is determined by the sampling rate in the analog-to-digital conversion.

Unlike conventional convolution circuits, however, the convolution circuit 224 in the present invention effectively improves the sampling rate at which the return pulse is digitized. The convolution circuit 224 does so by "interpolating" between samples. For an R:1 interpolation, where R>1, each sample is clocked out of the buffer 222 and into the convolution circuit 224 R times before clocking out the next sample so that each sample is fed into the convolution R times. Thus, the convolution circuit 224 repeatedly convolves each one of at least a portion of the buffered samples R times, wherein R>1, as set forth in box 120 in FIG. 1. (In some embodiments, the return pulse is windowed such that only a portion of the samples are convolved as is discussed further below.) This convolution technique may also be conceptualized as shifting the template in steps smaller than the input samples such that a correlation determination can be made at points in between the discrete samples. This new convolution technique therefore produces an effective sampling rate potentially much higher than the actual sampling rate without directly impacting the data acquisition. Consequently, the resolution of the range extracted therefrom is improved by a factor of R.

The peak detect circuit 226 processes the evaluation numbers from the convolution circuit 224 to determine the point in time where a "best match" occurs between the return pulse and the template. "Best match" is defined, in this context, as the set of samples among those filtered whose correlation with the template is highest. By identifying the portion of the sampled return signal that best matches the stored template, the peak detect circuit 226 effectively determines the time at which the return pulse was received. Thus, the peak detect circuit 226 detects the received signal's center of energy from the convolution results as set forth in box 122 of FIG. 1. Technically, as those in the art having the benefit of this disclosure will appreciate, the peak detect circuit 226 detects the peak of the processed, digitized samples, which theoretically represents the peak of the return signal 226. However, in practice, this is not always the case as the data may be corrupted or polluted. Thus, the peak of the processed samples indicates the return pulse's center of energy, from which the time at which the pulse was received may be more accurately determined.

In the embodiment illustrated in FIG. 1, the transmitter 214 and the receiver 218 are both a part of the apparatus 200. Thus, the process of determining range from the return time of the pulse is simplified in that it can be assumed to be half the time elapsed between the transmission and receipt of the pulse. This is not necessarily true where the transmitter 214 is mounted to a separate platform and, in some embodiments, additional signal processing may be required.

Figure 3:
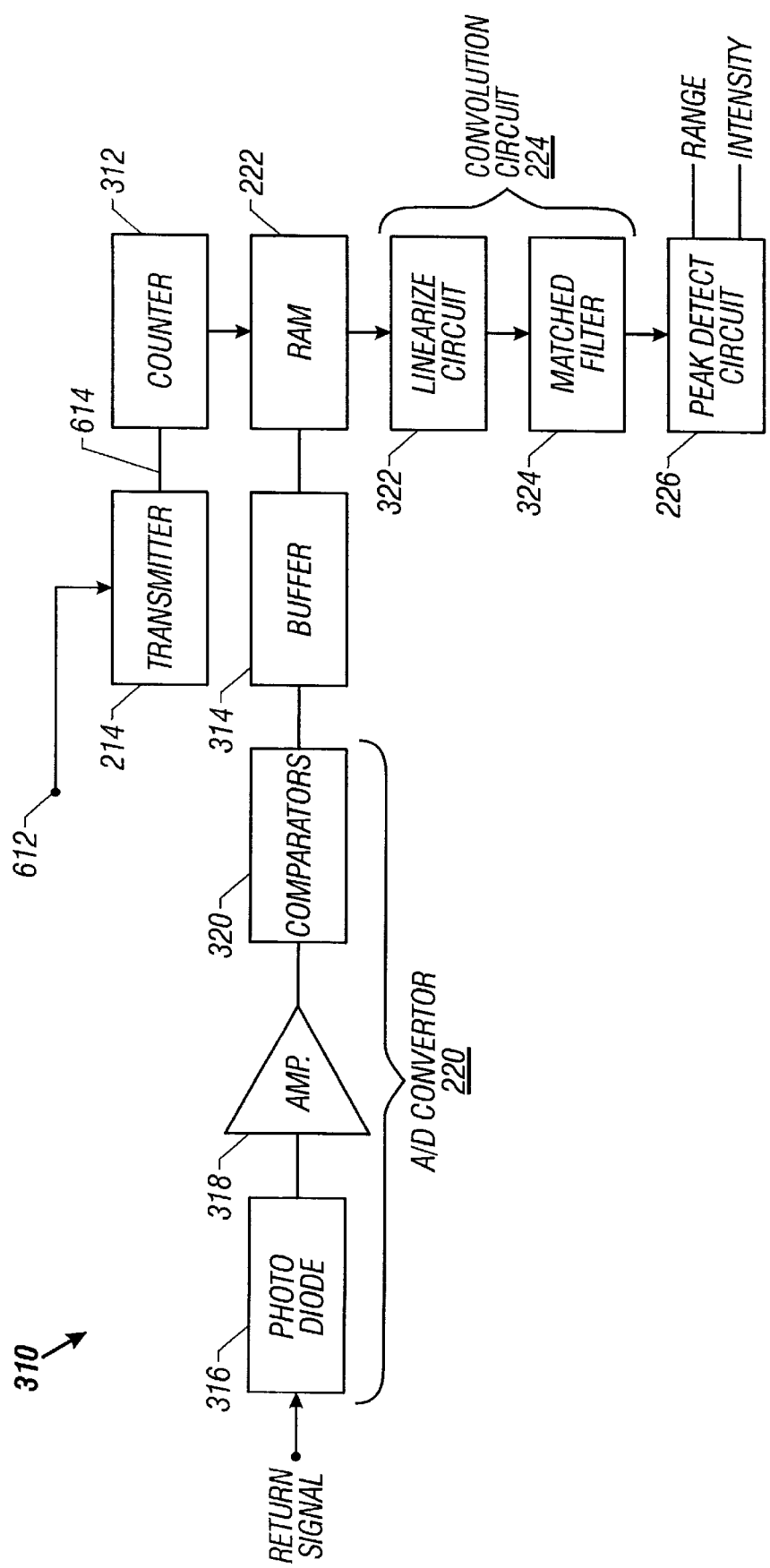
FIG. 3 is a block diagram of the electronics for one particular embodiment with which the invention may be practiced, the embodiment including a technique for windowing the received signal and employing a particular convolution circuit.
Figure 4:
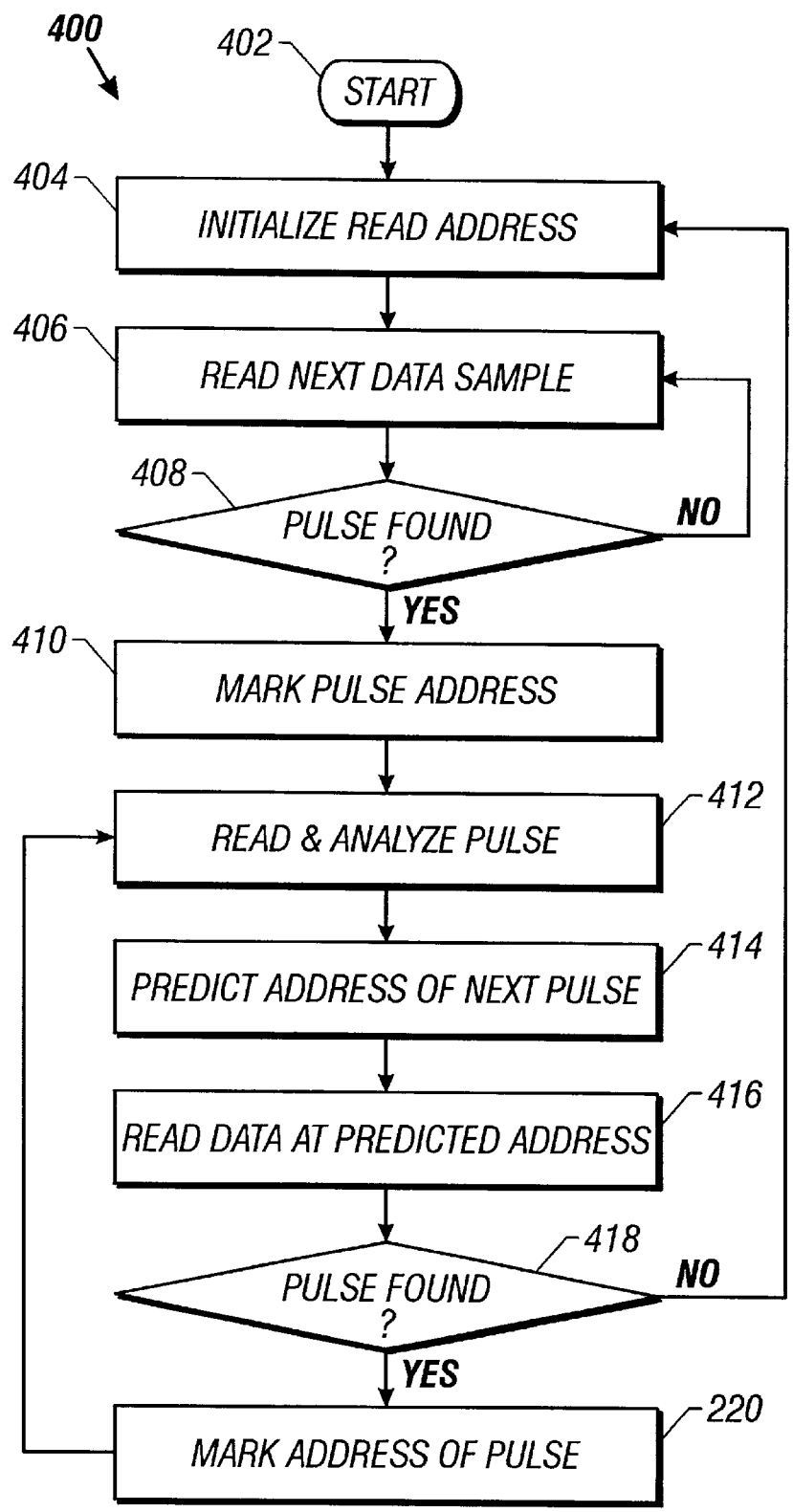
FIG. 4 is a flowchart of the process of the windowing technique of the embodiment in FIG. 3.
Figure 5A:
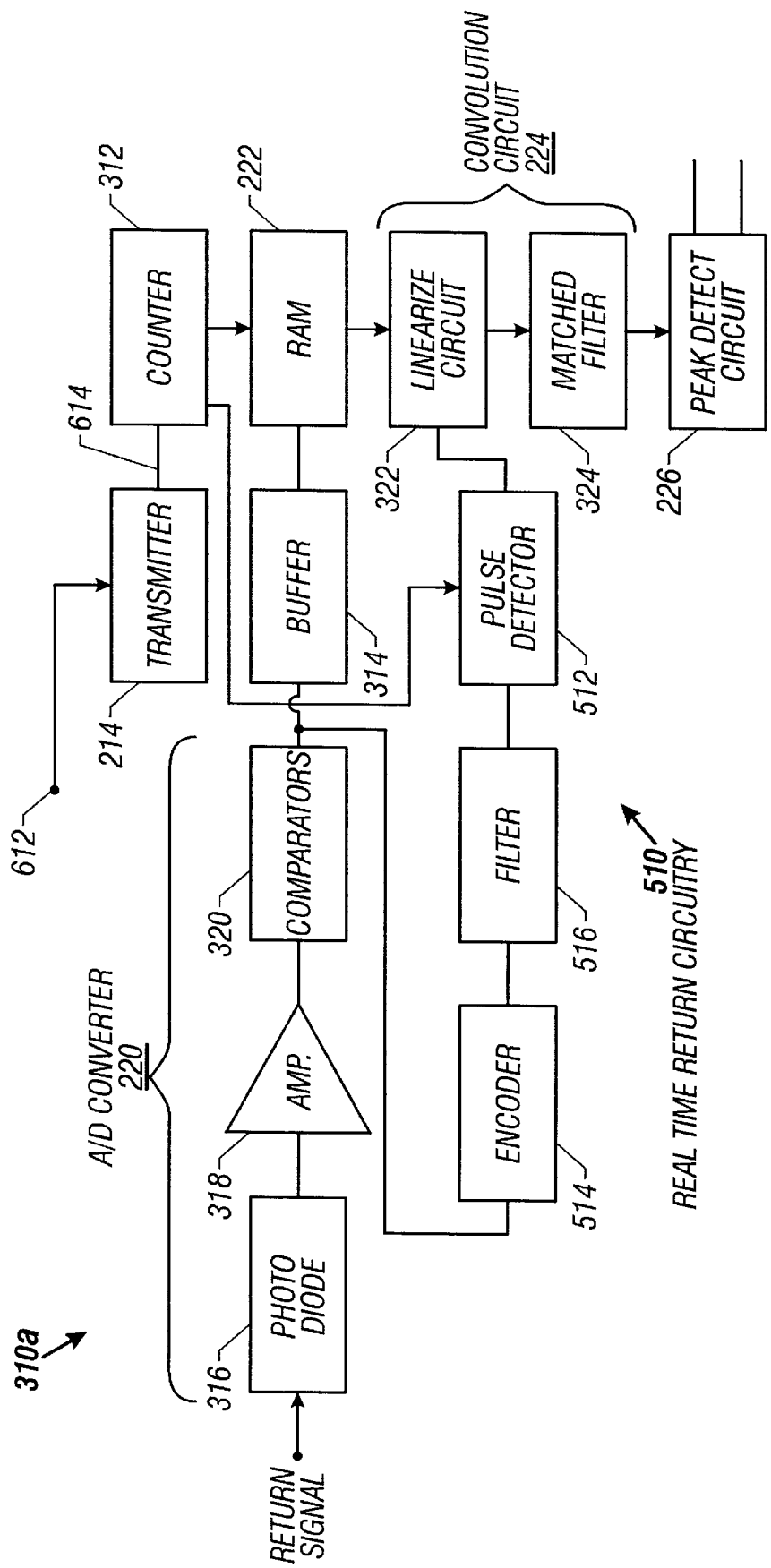
FIGS. 5A–5B are block diagrams of embodiments alternative to that of FIG. 3 for implementing alternative windowing techniques, but employing the same convolution circuit.
Figure 5B:
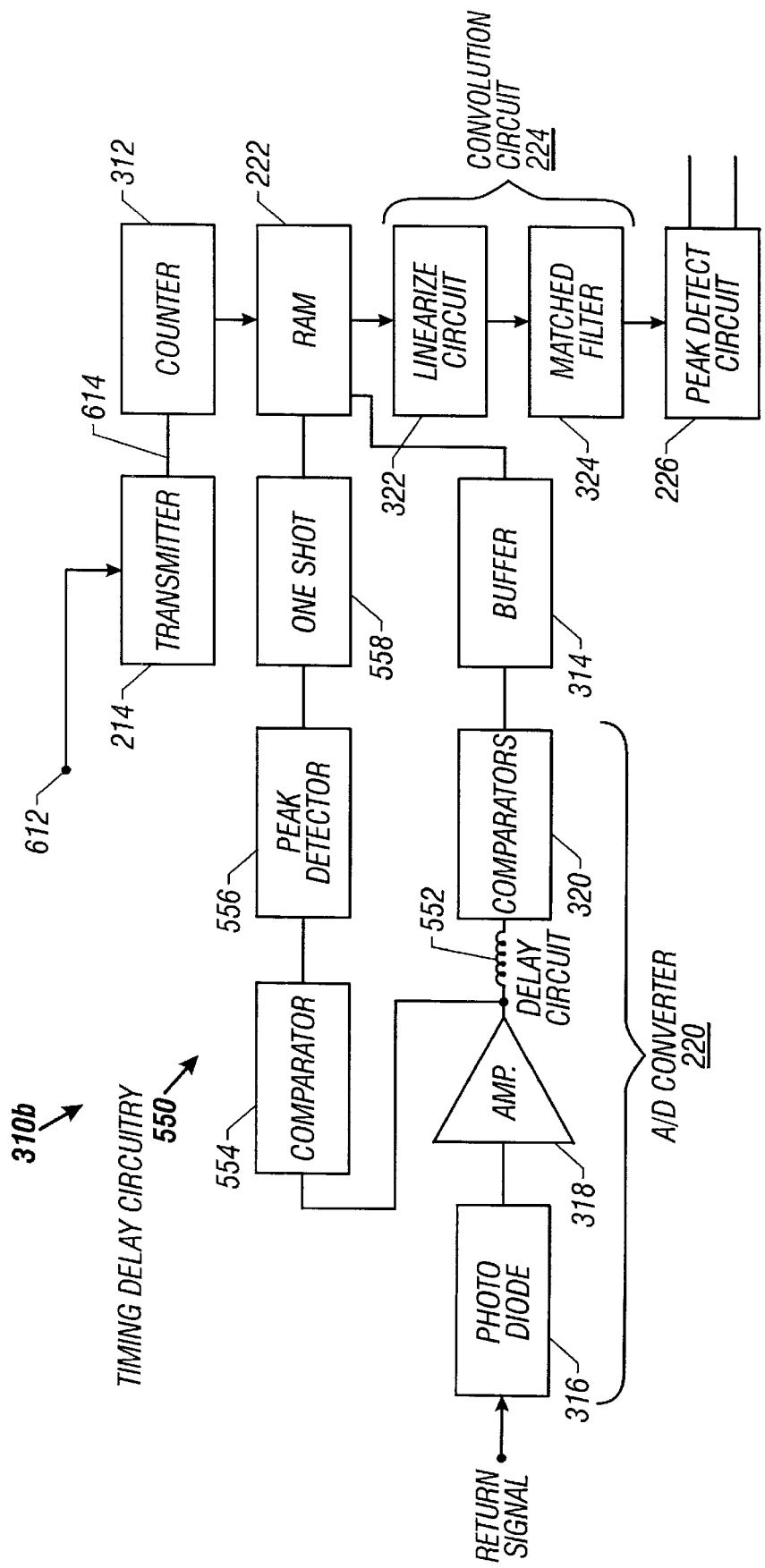

A Particular Embodiment, and Variations Thereon, that Windows the Return Pulse FIGS. 3–4 illustrate one particular embodiment of the invention including a technique for windowing the received signal and employing a particular convolution circuit. FIGS. 5A and 5B present alternative variations on the apparatus of FIG. 3 with which the windowing function can be implemented. This embodiment is essentially the LADAR system disclosed in my U.S. Pat. No. 5,357,331, mentioned above, modified as discussed below to implement the present invention. In this embodiment, light pulses are reflected off a target, received by optical equipment, converted into analog electrical signals, and then processed to obtain information therefrom, and the range to the target by measuring the time delay between a transmitted signal and a received or "return" pulse as discussed above. However, this embodiment also includes a windowing system to more efficiently process digitized electrical signals representing the return signals.

Turning now to FIG. 3, in an illustrative implementation, the invention includes certain pulse capture electronics 310 that initiate firing of a laser transmitter 214 and determine the time-of-flight (i.e., range) and intensity of the returning laser pulses. Also, the pulse capture electronics 310 direct this data to a processor (not shown) for execution of specific targeting algorithms. The pulse capture electronics 310 comprise a number of signal processing stages, including an analog-to-digital converter 220, a RAM buffer 222 clocked by a counter 312, a convolution circuit 224, and a peak detector circuit 226. The pulse capture electronics 310 may also include an optional data buffer 314, which in this particular embodiment comprises an emitter-coupled logic (ECL) buffer. In one embodiment, the above-mentioned stages of the pulse capture electronics 310 comprise a multichannel, monolithic, digital integrated circuit with an embedded analog comparator front end.

The converter 220, in this embodiment, includes an avalanche photo diode 316, an amplifier 318, and a number of nonlinear comparators 320. The avalanche photo diode 316 converts light pulses received by the optical equipment of the receiver (not shown for this embodiment) into an electrical input signal; this signal is amplified by the amplifier 318 and directed to the comparators 320. If the laser transmitter 214 is configured to transmit modulated light signals, then a circuit such as a capacitive envelope detector (not shown) is interposed between the amplifier 318 and the comparators 320 to generate a signal representative of the envelope of the received modulated signal as is known. Multiple comparators 320 are provided, and each comparator 320 is provided with reference voltages spaced in logarithmic intervals over the range of expected voltage signals. As the voltage threshold of each comparator 320 is exceeded, the comparator 320 turns on, such that the comparators 320 together produce a type of signal known as a "thermometer code."

Thus, the comparators 320 digitize the received signal into a plurality of digital samples. The output, i.e., the digitized samples, of the comparators 320 is received by the buffer 314. In this particular embodiment, the buffer 314 processes the samples for storage in the RAM 222. As noted above, the buffer 314 is not necessary to the practice of the invention and may be omitted from some alternative embodiments. Thus, the inclusion of the buffer 314 and the particular processing used to prepare the samples for storage in the RAM 222 are implementation specific.

The timing of the RAM 222 is controlled by the counter 312. The RAM 222 is initiated when the laser transmitter 214 is triggered by a trigger signal on the firing line 612. After the RAM 222 is initiated, the RAM 222 stores data received from the buffer 314 while receiving a clocking signal from the counter 312. The clocking signal is continued for a period of time corresponding to the maximum range of the system, whereupon the RAM 222 stops storing data. The time of flight of the laser pulse to an object and back to the electronics 310 is relatively short compared to the rate at which pulses are transmitted. The pulse capture electronics 310 of the present invention advantageously utilizes this fact by sampling at a first, typically high, frequency, storing them, and then processing the stored samples more slowly at a second frequency.

Between receipt and storage of the next transmitted pulse, the stored samples are read and processed by the convolution circuit 224 and the peak detect circuit 226. Specifically, the convolution circuit 224 reads at least a portion of the samples from the RAM 222. Typically, the convolution circuit 224 will read the entire batch of samples, wherein a "batch" includes all data corresponding to light detected during the clocking of the RAM 222. Each sample is clocked out of the RAM 222 to the convolution circuit 224 R times for an R:1 interpolation before the next sample is also clocked out of the RAM 222 to the convolution circuit 224 as was discussed above.

The convolution circuit 224 includes a linearize circuit 322 and a matched filter 324. The linearize circuit 322 converts each of the seven binary levels back to the appropriate linear threshold level (i.e., 10 mV, 20 mV, 40 mV etc.). The linearize circuit 322 may comprise a programmable read only memory ("PROM") equipped with an appropriate lookup table. The matched filter 324 extracts range and intensity information from the data it receives from the linearize circuit 322, despite the noise and pulse-width variations of such data. The convolution circuit 224 then analyzes the samples to detect the peak of the return pulse. The filter 324 is loaded with the set of coefficients representative of the expected shape (or "template") of the return pulse. The filter 324 produces evaluation numbers indicative of the degree of correlation between the template and the return signal.

The peak detect circuit 226 processes the evaluation numbers output from the convolution circuit 224 to determine the point in time where a "best match" occurs between the return pulse and the template to effectively determine the time at which the return pulse was received. The peak detect circuit 226 may be constructed with various standard transistor-transistor-logic (TTL) circuits as are known in the art. The intensity of the return pulse may also be determined from the output of the convolution circuit 224 in some embodiments.

Additionally, the embodiment of FIG. 3 includes electronics used to decrease the time required to process signals received from the RAM by defining a "window" in the RAM 222 within which past return signals have been stored, and "locking" on to this window to reduce time spent searching for future return signals in RAM 222. After identifying a return pulse, an external computing device (not shown) stores the memory address of a location in the RAM 222 at which the beginning of the return pulse is expected to be stored. Such a computing device may comprise a Motorola model DSP56000 digital signal processor or any other suitable computing device known to the art. In an exemplary implementation, the window may include 100 memory locations. The expectation is based on the average beginning memory address of several previous return pulses, and the computing device predicts the beginning memory address of the next return pulse. This memory address is used to define a "window," within which it is likely that the next return pulse will be stored. As new return pulses are received, the window is periodically updated, enabling the computing device to effectively "lock on" to the average return pulse. The pulse capture electronics 310 may consequently ignore the rest of the received information. In this way, the signal analysis for each return pulse is limited to a particular region of interest, since data located outside the window in the RAM 222 is ignored.

FIG. 4 illustrates the operation of this windowing system in greater detail by depicting a routine comprising a group of tasks 400 performed by the convolution circuit 224. After the routine begins in task 402, task 404 establishes the location of the addresses in the RAM 222 where data concerning the return pulse will be stored. Then, task 406 reads the data corresponding to a return pulse from the RAM 222. Task 406 continues to read data samples from the RAM 222 until query 408 determines that a return pulse was found. After query 406 identifies a return pulse, task 410 stores the memory address of the beginning of the return pulse; then, in task 412, the convolution circuit 224 and peak detector read the entire return pulse and analyze it. Note that, in accordance with the present invention, each sample is read R times, where R>1, before the next sample is read to implement an R:1 interpolation as was discussed above.

Then, task 414 averages the marked beginning of several previous return pulses; based on this average, task 414 predicts the memory address at which the next return pulse will begin. Task 414 takes this predicted memory address, and subtracts a selected number of memory locations (e.g., 50 memory locations) to define the beginning of a "window" within which it is likely that the next return pulse will be stored. After another laser signal has been transmitted and received, task 416 begins reading data from the RAM 222 beginning with the marked window value. If query 418 determines that no return pulse was detected in the defined window, the program returns to task 404 to re-initialize the RAM 222, and start over. However, if the return pulse is identified in query 418, task 220 stores the memory address of the beginning of the return pulse, and the program continues in task 412. The process of identifying a return pulse, marking a window to predict the memory address of the next pulse, and reading and analyzing the next return pulse, if one can be identified, is repeated throughout the operation of the pulse capture electronics 310.

The routine 400 of FIG. 4, then, effectively "locks on" to the average return pulse, and quickly locates each return pulse based on this average window. By maintaining and constantly updating the window, the routine accounts for fluctuations in the return pulses, i.e. the earlier or later receipt of return pulses. This routine serves to limit return signal analysis to a particular region of interest, since data located outside of the window in the RAM 222 is ignored. This process takes advantage of the fact that changes in the distance between the hardware components of the invention and the target will be minimal from one pulse to the next, due to the high frequency at which the pulses are transmitted.

FIG. 5A illustrates a variant windowing approach involving real time return circuitry 510 to decrease the time required to process signals received from the RAM 222. In this embodiment, the pulse capture electronics 310 include a pulse detector circuit 512 to detect the maximum amplitude of the return signal and to store the value supplied by a counter (not shown) at that point. The value of the counter, then, provides the approximate location of the return signal in the RAM 222. Having this knowledge, the convolution circuit 224 is able to more efficiently read data from the RAM 222, since the data of the RAM 222 can be effectively narrowed to the area of interest.

This variation utilizes real time return circuitry 510 to establish a unique window for each pulse and to decrease the time required to process signals received from the RAM 222. Specifically, in this embodiment, the pulse capture electronics 310 include a secondary path in the form of a real time return system 510 comprising an encoder 514 electrically connected to the comparators 320, an optional filter 516 electrically connected to the encoder 514, and a pulse detector 512 electrically connected to the filter 516.

Pulse detection for purposes of windowing is subject to many variations. For instance, windowing pulse detection can be performed in either the analog or digital domains. This particular windowing technique also need only determine a window containing an approximate location for the received pulse, which has at least two consequences. First, the pulse detector 512 may employ a simple, less accurate threshold detection technique or a more accurate peak detection technique. Second, where pulse detection is performed in the digital domain, the sampling need not occur at the same rate as in the analog-to-digital conversion in performed by the converter 220. Whereas the converter 220 samples the received pulse at 1 GHz in the particular embodiment illustrated, this alternative might sample for pulse detection at only 250 MHz.

The real time return circuitry 510 identifies the presence of a return pulse and its approximate location; the RAM 222 will contain the precise location of the pulse. The return pulse will typically be many samples wide, and in an exemplary implementation the width of the return pulse may be on the order of 10 or 20 memory locations. The secondary path of the circuitry 510 operates at a lower rate than the components 80, 318, 320, and 314.

In an illustrative implementation, the encoder 514 comprises a model F100165 ECL priority encoder, or similar circuit to transform the 7-bit "thermometer" input from the comparators 320 into a 3-bit binary output representative of the magnitude of the return signal. The filter 516 comprises a filter such as a F100181 ECL adder, or another similar filter capable of averaging two or more samples together. The pulse detector 512 comprises a model F100166 ECL, and operates to detect the maximum amplitude of the return signal and to store the corresponding value of the counter 312 when the maximum return signal is received.

The counter 312 is initialized when the RAM 222 is activated. When the pulse detector 512 identifies a signal that indicates the receipt of a return signal, the pulse detector 512 stores the value of the counter 312. This value of the counter 312 defines a window around the location of the return pulse in the RAM 222. With this knowledge, the convolution circuit 224 is able to more efficiently analyze data from the RAM 222, since the convolution circuit 224 need not read extraneous data stored in the RAM 222 prior to receipt of the return pulse.

FIG. 5B a second variant windowing approach involving a timing delay circuit 500 that decreases the required size of RAM 222 by delaying storage of data until a return pulse is actually received, thereby conserving memory and storing each return pulse the same region of memory. With the timing delay circuit 500, analog-to-digital conversion of the return pulse is delayed, permitting the pulse detector circuit 556 to identify the receipt of a return pulse on a non-delayed time frame, and, in advance, to activate the RAM 222 for storage of the delayed converted digital pulse.

The circuit 500 includes a delay circuit 552, which may comprise a coil of wire, fiber optic link, an arrangement of transistors, or another circuit for introducing a 20–30 nsec delay into the signal produced by the amplifier 318. The circuit 500 also includes a comparator 554, which may comprise a circuit similar to the comparator 320. The circuit 500 additionally includes a peak detector 556, which operates to provide an output indicative of the largest magnitude signal detected received from the comparator 554. Unless it is reset, the output of the peak detector 556 is updated only if the peak detector 556 receives a signal having a larger magnitude than the previously detected peak. Whenever the peak detector 556 is updated with such a signal of larger magnitude, a one shot 448 is triggered, thereby providing an output pulse to the RAM 222. This pulse causes the RAM 222 to begin storing data received by the buffer 314; such storage continues until the pulse produced by the one shot 448 ends.

The circuit 500 therefore effectively "triggers" the RAM 222 to store data for a preselected time period, by selectively enabling the RAM 222 when a signal of sufficient magnitude is detected. The storage performed by the RAM 222 is clocked by the counter 312, and the preselected period is determined by the width of the pulse provided by the one shot 448. By establishing the width of the one shot pulse to be greater than the expected return pulse, the RAM 222 can be controlled to effectively store the entire return pulse. After storage of a return pulse is completed, the peak detector 556 is reset.

The windowing technique offers a number of advantages. For example, the windowing technique of FIG. 3 and the real time return technique of FIG. 5A facilitate reduced processing times by enabling the convolution circuit 224 to more efficiently locate the return pulsed thereby eliminating time spent processing unimportant data. The real time return technique of FIG. 5A also prevents wasted data storage that would otherwise occur when receipt of a return signal is thwarted due to an external event; this is possible, since the search of the RAM 222 is coordinated with detection of an actual return signal. Similarly, the timing delay technique of FIG. 5B requires less RAM than some other arrangements.

A Particular Implementation of the Embodiment in FIG. 3

Figure 6A:
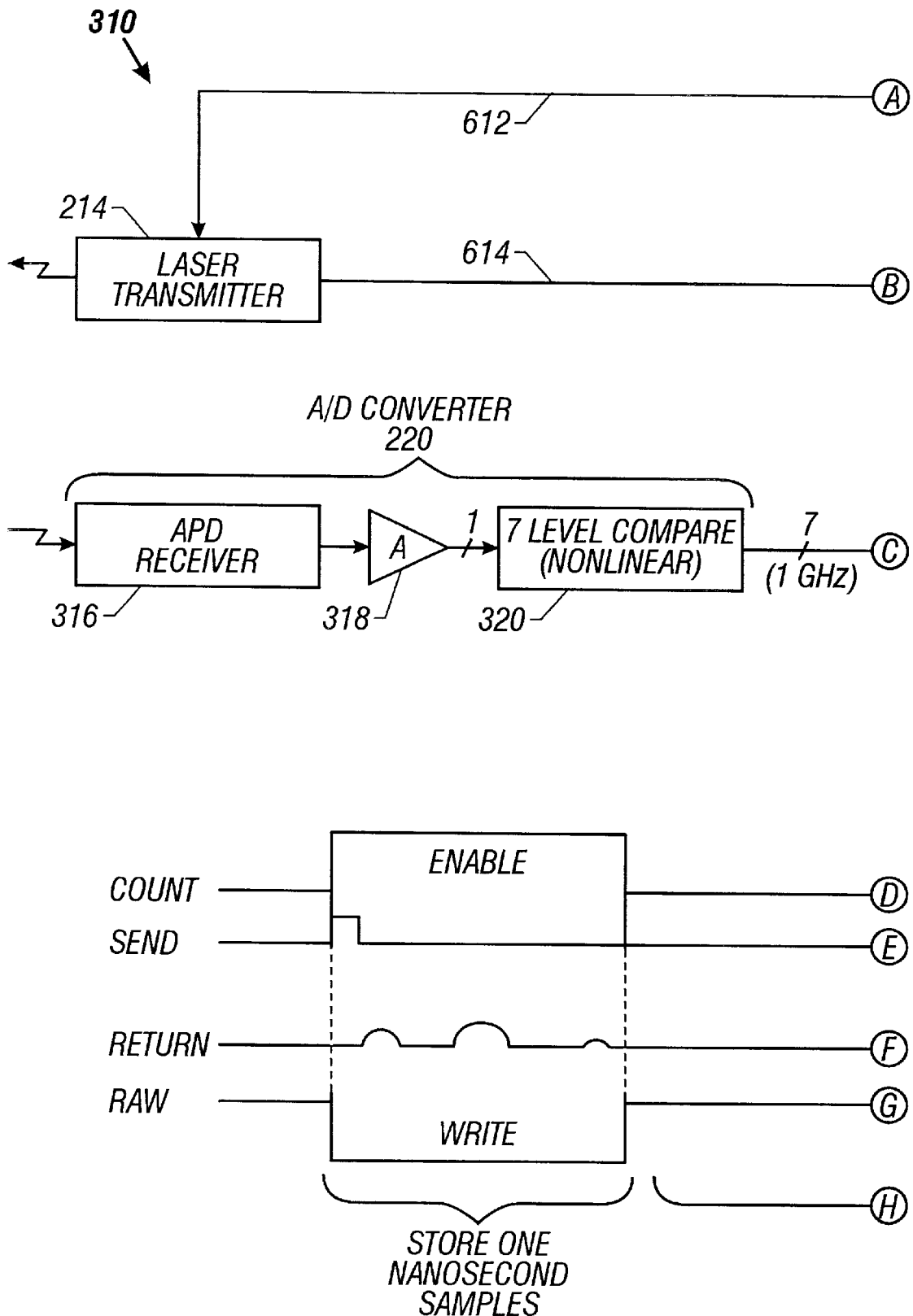
FIG. 6 is a block diagram of the processing circuitry.
Figure 6B:
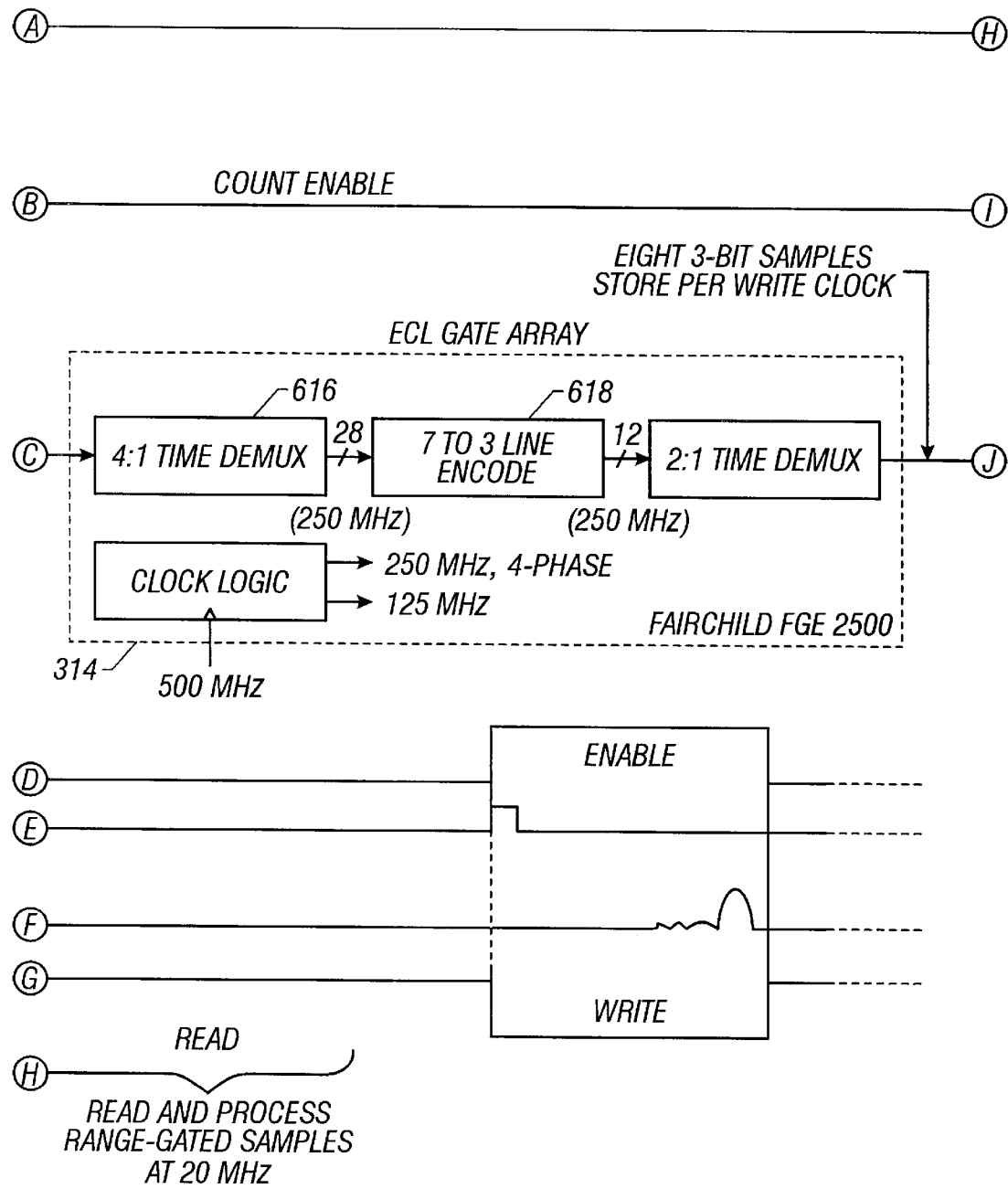
Figure 6C:
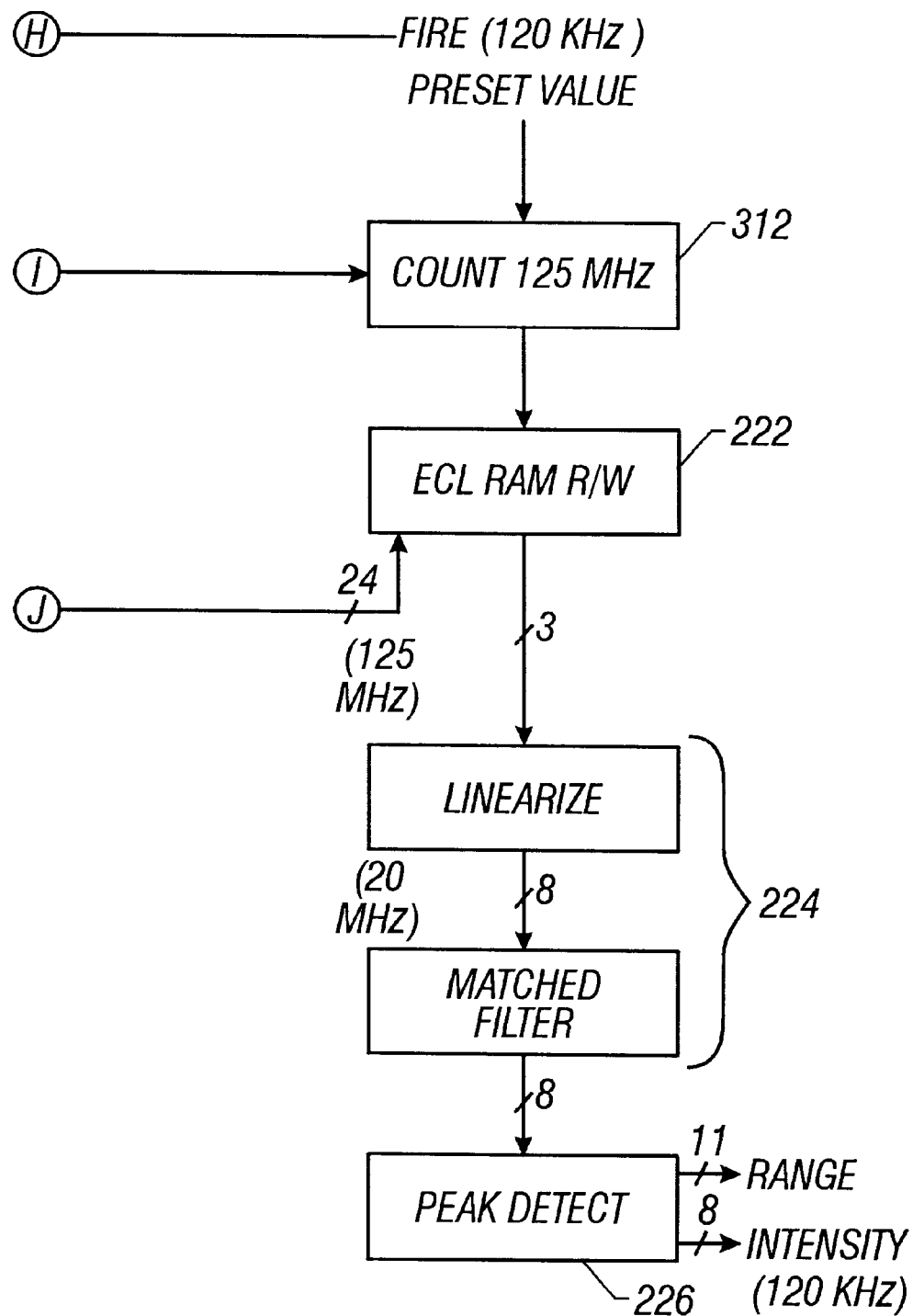
Figure 7:
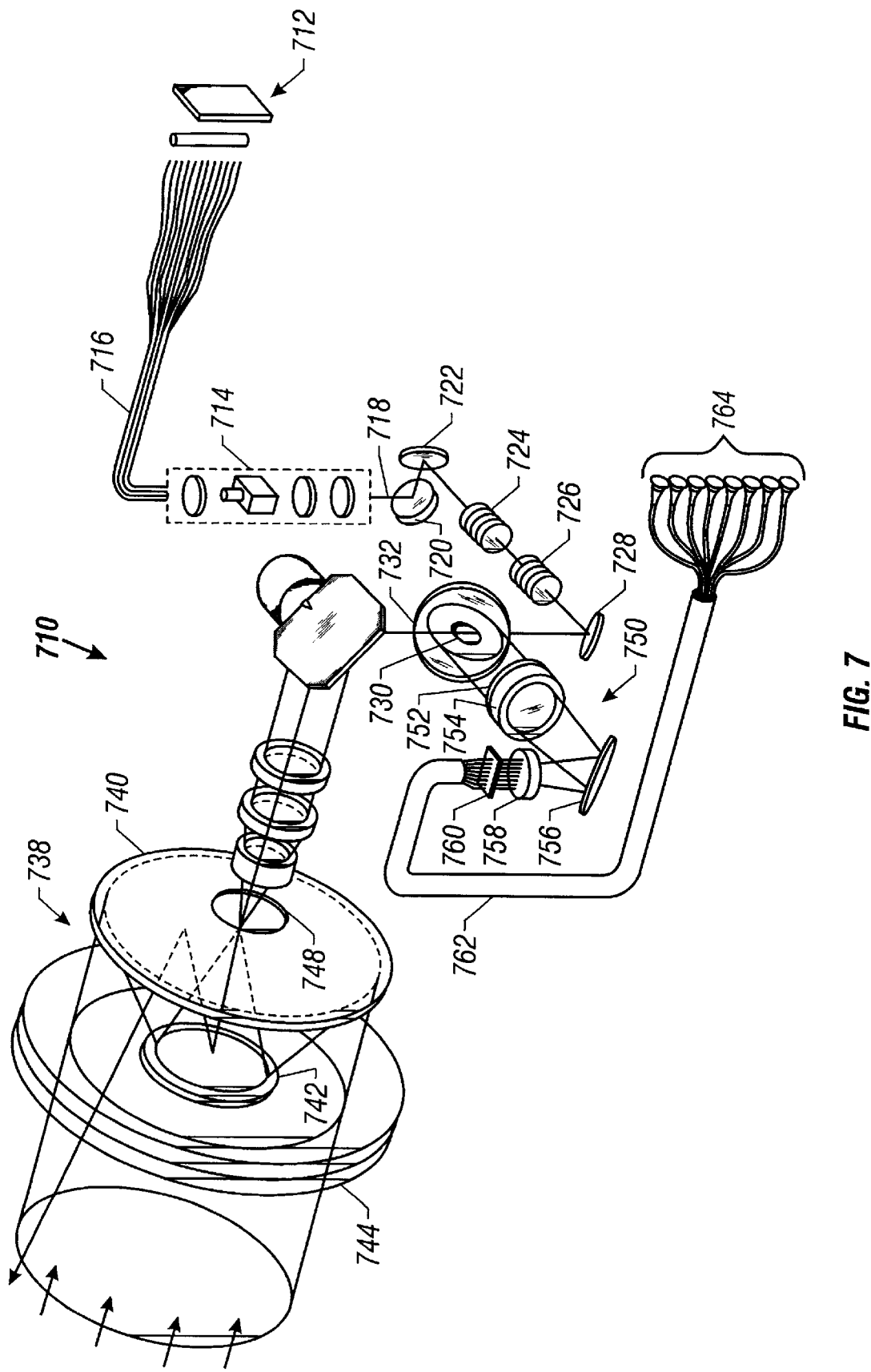
FIG. 7 is an exploded view of several components of the optical train depicting the environment of the present invention.

FIGS. 6–7 present a particular implementation of the embodiment in FIG. 3. This implementation provides a LADAR seeker and guidance system adapted to scan a target area with laser energy, detect the reflected laser energy, and compute range and intensity values, permitting the processing of guidance and control signals for a missile as it approaches the target. In a preferred embodiment, the system is used as a missile guidance system to identify and home in on a military target. The system is capable of generating three dimensional images of target areas by ranging on points in the imaged scene. This system is essentially the one more fuilly disclosed and claimed in my U.S. Pat. No. 5,243,553, entitled "Gate Array Pulse Capture Device," issued September 1993, to what is now Lockheed Martin Corporation as my assignee, as modified to practice the present invention.

The pulse capture electronics 310 are employed for actuating a LADAR transmitter and for processing the laser signals reflected from the target area. The circuitry of the present invention relates to a system for processing reflected signals generated by the LADAR transceiver of FIG. 7 in which signals reflected from a target area are to be processed for producing guidance correction signals. The processing system determines where a target is located, identifies the target, and provides guidance signal information such as line-of-sight rate, range, range rate, and a relative position vector ($\Delta x$, $\Delta y$, and $\Delta z$). Range and intensity information are generated for a two-dimensional array of points scanned by the LADAR seeker. Range data is obtained by measuring the time delay between transmitted and received laser light pulses emitted by the seeker.

FIG. 7 provides an exploded view of some of the optics of a seeker head 710 and illustrates the environment in which the present invention is intended to operate. One particular embodiment of the invention is a LADAR seeker head ("LASH") aboard a flying submunition (not shown). The manner in which LASH generates, transmits, and receives a LADAR scan pattern is more fully disclosed and claimed in U.S. Pat. Nos. 5,200,606; 5,224,109; and 5,285,461, each of which is hereby expressly incorporated by reference for all purposes as if set forth verbatim herein.

The pulses are provided by a Q-switched, solid-state laser 714, pumped by an external, remotely located diode laser 712, such as a gallium Aluminum arsenide ("GaAlAs") diode laser, for example. The diode laser 712 pumps a solid state laser 714, which emits the laser light energy employed for illuminating the target. The diode pumping laser 712 produces a continuous signal of wavelengths suitable for pumping the solid state laser 714, e.g., in the crystal absorption bandwidth. Pumping laser 712 has an output power, suitable in the 10–20 watt range, sufficient to actuate the solid state laser 714. Output signals from the pumping laser are transmitted through an input lens and through a fiber optic bundle 716 which has sufficient flexibility to permit scanning movement of the seeker head during operation.

The solid state laser 714 may be suitably a Neodymium doped Yttrium Aluminum Garnet (Nd:YAG), a Yttrium Lithium Fluoride (Nd:YLF), or a Yttrium Vanadate (Nd:YVO$_4$) laser operable to produce pulses with widths of 10 to 20 nanoseconds, peak power levels of approximately 10 kilowatts, at repetition rates of 10–120 KHz. The equivalent average power is in the range of 1 to 4 watts. The preferred range of wavelengths of the output radiation is in the near infrared range, e.g., 1.047 or 1.064 microns.

The output beam 718 generated by solid state laser 714, in the present embodiment, is successively reflected from first and second turning or folding mirrors 720 and 722 to beam expander 724. The beam expander 724 comprises a series of (negative and positive) lenses which are adapted to expand the diameter of the beam to provide an expanded beam, suitably by an 8:1 ratio, while decreasing the divergence of the beam.

The expanded beam is next passed through a beam segmenter 728 for dividing the beam into a plurality of beam segments arrayed on a common plane, initially overlapping, and diverging in a fan shaped array. The beam segmenter 728 preferably segments the beam into 8 separate but overlapping beam segments. The divergence of the segmented beams is not so great as to produce separation of the beams within the optical system, but preferably is sufficiently great to provide a small degree of separation at the target, as the fan-shaped beam array is scanned back and forth over the target.

The resultant segmented beams are then reflected from a third turning mirror 728, passed through a central aperture 730 of an apertured mirror 732, and subsequently reflected from a scanning mirror 734 in a forward direction relative to the missile. The scanning mirror 734 is pivotally driven by a scanning drive motor 736, which is operable to cyclically scan the beam array for scanning the target area. The beam array is preferably scanned at a rate of approximately 100 Hz. The turning axis of the scanning motor is aligned in parallel with the segmenter wedges whereby the resultant beam array is scanned perpendicularly to the plane in which the beams are aligned.

An afocal, Cassigrainian telescope 738 is provided for further expanding and directing the emitted beam. The telescope 738 includes a forwardly facing primary mirror 740 and a rearwardly facing secondary mirror 742. A protective outer dome 744 of a suitable transparent plastic or glass material such as BK-7 is mounted forward the secondary mirror 742. A lens structure 746 is mounted in coaxial alignment between the primary mirror 740 and the scanning mirror 734, and an aperture 748 is formed centrally through the primary mirror in alignment with the lens structure. The transmitted beams which are reflected from the scanning mirror are directed through the lens structure 746 for beam shaping, subsequently directed through the aperture 748 formed centrally through the primary mirror, and subsequently reflected from the secondary mirror 742 spaced forwardly of the primary mirror and then reflected off the primary mirror 740 and out through the transparent dome 744.

The resultant transmitted beam is a fan shaped array which is scanned about an axis parallel to its plane. The beams are in side-by-side orientation mutually spaced by a center-to-center distance of twice their diameters. Thus, the solid state laser 714, the diode laser 712, the beam expander 724, the beam segmenter 728, the lens structure 746, and the associated components comprise, by way of example and illustration, a means for transmitting the signal.

The reflected radiation, i.e., laser energy reflected from the target when illuminated by the array of transmitted beams, is received by the telescope 738, and reflected successively by the primary mirror 740 and the secondary mirror 742, the lens assembly 746, and the scanning mirror 734, toward the apertured mirror 732. Because the reflected beam is of substantially larger cross-sectional area than the transmitted beam, it strikes substantially the entire reflecting surface of the apertured mirror 732, and substantially all of its energy is thus reflected laterally by the apertured mirror toward collection optics 750.

The collection optics 750 includes a narrow band filter 752, for filtering out wave lengths of light above and below a desired laser wavelength to reduce background interference from ambient light. The beam then passes through condensing optics 754 for focusing the beam, and then a fourth turning mirror 756 re-directs the beam segments toward a focusing lens structure 758 adapted to focus the beam upon the receiving ends 760 of a light collection fiber optic bundle 762. The opposite ends of each optical fiber 762 are connected to illuminate diodes 764 in a detector array, whereby the laser light signals are converted to electrical signals which are conducted to a processing and control circuit of the present invention. The diodes 764 of FIG. 7 comprise a portion of the receiver 316 in FIG. 6.

The fiber optic bundle 762 includes nine fibers, eight of which are used for respectively receiving laser light corresponding to respective transmitted beam segments and one of which views scattered light from the transmitted pulse to provide a timing start pulse. The light received by the ninth fiber is transmitted to one of the diodes 764 of the detector array. The input ends 760 of the fibers 762 are mounted in linear alignment along an axis which is perpendicular to the optical axis. The respective voltage outputs of the detectors 764 thus correspond to the intensity of the laser radiation reflected from mutually parallel linear segments of the target area which is parallel to the direction of scan. Thus, the elescope 738, the collection optics 750, the condensing optics 754, the detection array 764, and associated components comprise, by way of illustration and example, a means for receiving the laser light energy.

Returning to FIG. 6, a particular implementation of the pulse capture electronics 310 is shown. The pulse capture electronics subsystem initiates the firing of the laser transmitter and determines the time-of-flight (range) and intensity of the returning laser pulses. The sensor supplies eight analog electrical channels to the circuit for analysis. The pulse capture electronics (PCE) 310 sends the results of the analysis to a processor (not shown) for execution of the targeting algorithms. The PCE 310 comprises primarily five signal processing stages: (a) an analog-to-digital converter 220, (b) a buffer 314, (c) a random access memory ("RAM") buffer 222, (d) a matched-filter convolution circuit 224, and (e) a peak detector 226. In the preferred embodiment, these stages suitably comprise a multichannel, monolithic, digital integrated circuit with an imbedded analog comparator front end.

The buffer 314 in this implementation comprises an emitter coupled logic ("ECL") gate-array that digitizes the received signal at a 1 GHz sampling rate to yield a ranging resolution of 15 centimeters. An ECL RAM 222 stores these one nanosecond samples during the range-gated receive period. Dead time between transmitted pulses is used to read and analyze the stored samples at a 20 MHz rate, as required for processing. A matched filter 224 technique extracts the range and intensity information from the data stream which contains the returned pulse. This process produces accurate data under low signal-to-noise conditions and with widely varying reflectivity returns, and can isolate secondary returns from interference such as from under trees or behind camouflage nets.

An analog, received signal is converted to a digital signal by a 1 GHz flash converter process. A bank of voltage comparators is employed, and comparison is accomplished by first converting each pulse signal to a string of digital signals. Each sample point (every nano-second) equals the instantaneous amplitude of the signal received during each nanosecond. This is accomplished in the converter 220 and the gate array circuit 314.

The converter 220 preferably has seven individual comparators. The converter 220 includes an avalanche photo diode 316, an amplifier 318, and the nonlinear comparators 320. The comparators 320 are preferably flash converters ganged together spaced apart in their threshold in a logarithmic function, between 30 mV and 1 volt, based on expected return. In an alternative embodiment, the comparators 320 comprise seven flash converters, where the converters detect signals above 10 mV, 20 mV, 40 mV, 80 mV, 160 mV, 320 mV, and 640 mV, respectively. Returning to FIG. 6, the avalanche photo diode 316 converts the return light pulse into an electrical input signal. The input signal is fed to all seven comparators at once, but each has a different reference voltage, and levels being spaced in logarithmic intervals over the expected voltage range. Starting at the lower level, all the analog comparators with digital outputs operate like an operable amplifier with no feedback and each output has a frequency of 1 GHz.

The ECL gate array 314 samples the status or state of the bank of comparators every nanosecond to determine how many are turned on. The ECL gate array may comprise a Fairchild FGE 2500 ECL gate array. Every nanosecond, the highest comparator turns on and is assigned a digital word (0, 1, 2 through 7). This results in a "thermometer code", meaning that all comparators up to a certain voltage level are turned on.

As shown in FIG. 6, the comparators feed the ECL gate array 314 at 1 GHz. The gate array 314 has three functions in this implementation: to sample the input waveform at 1 GHz, convert the "thermometer code" into a 3-bit word proportional to the peak of the input signal in an encoder 618, and to time de-multiplex the signal to 125 MHz compatible with the RAM 222. A 4:1 time demultiplexer 616 is provided which, in operation, allows 4 nsec for the encoding of a signal. From the gate array 314, eight three-bit samples are stored in the ECL RAM each write clock. After linearization in the convolution circuit 224, the samples are processed at 20 MHz. This technique simplifies the pulse capture and analysis circuit and thus reduces the cost. Note that, in some embodiments, one of more of the RAM 222, the convolution circuit 224, and the peak detect circuit 226 might be incorporated into the ECL gate array while maintaining their functionality.

A firing circuit fires a laser transmitter 214 via a firing connection 612 at 120 KHz. The time of flight of the laser pulse to a target and back to the receiver 80 is relatively short compared to the pulse repetition rate. The pulse capture device of the present invention advantageously utilizes this fact by sampling at 1 GHz and processing the samples more slowly, at 20 MHz. The firing of the laser transmitter 214 also enables a counter 312 via a count enable 614. Each sample in the window is clocked out of the RAM 222 R times for an R:1 interpolation as discussed above at 20 MHz to the convolution circuit 224. The filter 324 of the convolution circuit 224 may comprise a Zoran model ZR33891 finite impulse response circuit, one of the two filters discussed immediately below, or any other suitable FIR filter known to the art. Thus, the filter 324 and the linearize circuit 322, the Zoran FIR response circuit, or the two filters discussed below may comprise, by way or example and illustration, a means for convolving the digitized samples in various embodiments.

Greater accuracy in range determination can be had by some alternative variations on the implementation of FIGS. 6–7. A more accurate determination of the transmission time for the pulse can be had by deploying an optical pickup and replicating the data channel comprising the analog-to-digital converter 220 and buffer 314 for processing the output of the optical pickup. The optical pickup will receive information, including the energy pulse fired by the transmitter 214 when the transmitter is triggered. The replicated data channel may then process the information to determine the time at which the pulse is transmitted by either threshold, peak detection, or template matching techniques as discussed above. Such an implementation of the present invention would then improve both the resolution and accuracy of range determinations.

Alternative Hardware Implementations for the Add and Multiply Functions of the Convolution As noted above, any convolution circuit including a matched filter known to the art can be employed to perform the convolution of the samples with the template, provided it is modified to clock each sample R times to perform an R:1 interpolation. However, in the interest of completeness, two alternative convolution circuits are disclosed. A first, conventional convolution circuit illustrated in FIGS. 6–12 and a second convolution circuit employing a processing technique reducing the amount of hardware needed to implement it is illustrated in FIGS. 13–27. Both of these convolution circuits are also disclosed in my U.S. Pat. No. 5,511,015, entitled "Double-Accumulator Implementation of the Convolution Function," and issued Apr. 23, 1996, to what is now Lockheed Martin Corporation as my assignee. Each of these convolution circuits operates as described therein but are modified such that each sample is clocked out of the buffer and into the convolution circuit R times to effect an R:1 interpolation.

Figure 8:
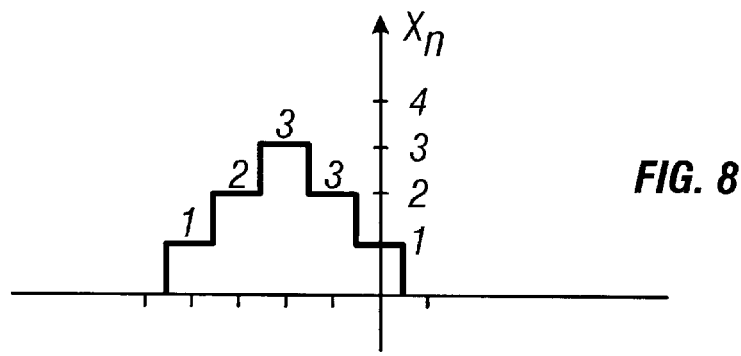
FIG. 8 is a graph of a filter coefficient stream ("FCS") representing an example of an input signal for both a prior art circuit implementation and a circuit implementation in accordance with the principles of the present invention.
Figure 9:
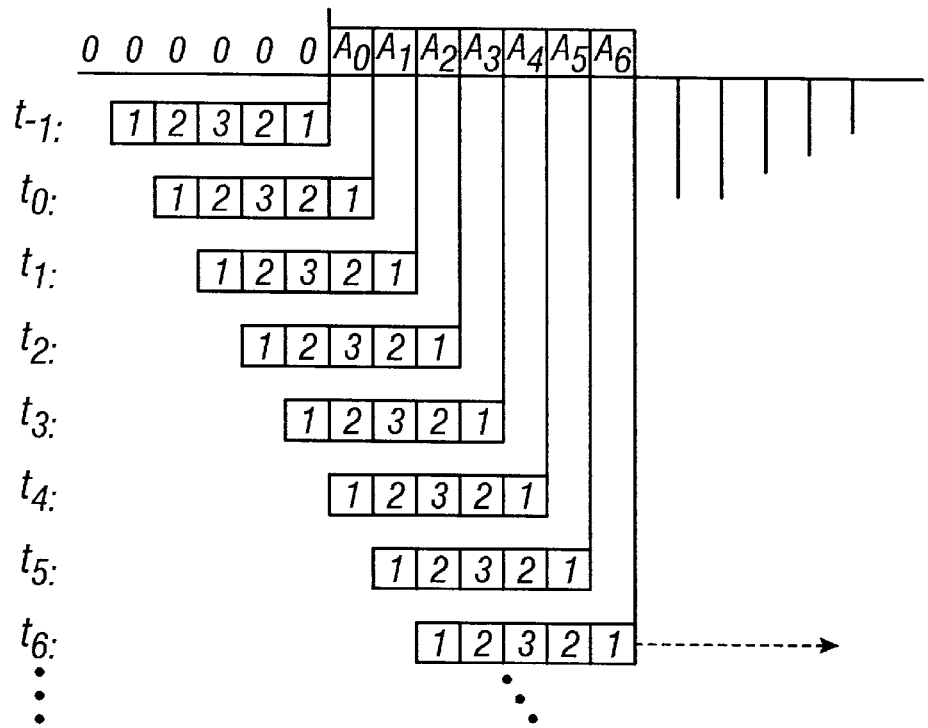
FIG. 9 is a table illustrating the convolution of the sample function of FIG. 8 for times ($t_{-1}, t_0, t_1, \ldots t_6$) and for each of "n" samples.

The first, conventional approach to real-time digital convolution is exemplified by way of FIGS. 8, 9, 10 and 11. FIG. 8 graphs a filter coefficient stream ("FCS"), i.e., the coefficients defining the template to be matched. The coefficients are represented in the figures by the notation $A_t$, where the subscript "t" shows the relative position of the coefficient in the FCS in the time domain. Using Equation 1, the convolution of this sample function is illustrated in FIG. 9 for times $(t_{-1}, t_0, t_1, \ldots t_6)$ for each of "n" samples.

Figure 10:
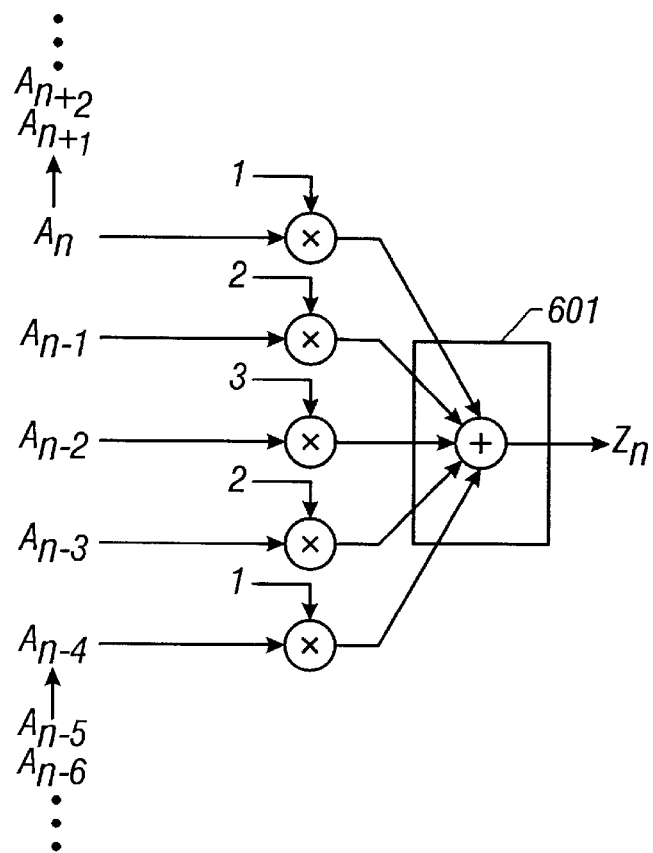

FIG. 10 shows the conventional high-speed circuit approach for implementing this convolution, using five multipliers arranged in parallel with a summation circuit 601 providing the convolution results, depicted as $(Z_n)$. In practice, the summation circuit 601 is implemented by several 2-input adders as shown in FIG. 12. Specifically a total of N−1 adders are required for the conventional implementation. The table shown in FIG. 11 illustrates the summation outputs as each of the samples is processed from the lowest-positioned of the multipliers to the highest-positioned of the multipliers, and assuming that $A_0$ is the first data sample having a non-zero value. Accordingly, for the conventional convolution implementation shown in FIGS. 10–12, four adders and five multiply operations are required for each output value of "n". Note that, in accordance with the present invention, each sample is read R times, where R>1, before the next sample is read to implement an R:1 interpolation as was discussed above.

In the second approach illustrated in FIGS. 13–27, the convolution circuit 224 uses a double-accumulator technique to reduce the number and complexity of multiply-and-add operations typically necessary per sample for the conventional approach. The amount of reduction depends upon the shape of the filter function, i.e., the numerical relationship between adjacent coefficients. If the filter function is expressed as a series of "piece-wise linear" segments, then this double-accumulator technique reduces the number of necessary multiply-and-add operations. A sequence of coefficients are said to be piece-wise linear if each successive term represents a constant change in value from the previous term.

Generally, this embodiment of the matched filter includes a plurality of multipliers and first and second accumulators. Each of the multipliers has an input and an output and each is configured to multiply an input data sample by a derived D-A (double-accumulator) coefficient. The first accumulator receives the outputs of the multipliers. The second accumulator receives an output from the first accumulator. In a more specific implementation, the matched filter further includes a shift register for sequentially receiving input data samples and for providing the input data samples to the inputs of the multipliers.

Preferably, a double-accumulator is implemented using a set of D-A coefficients, which are derived from the input filter coefficient stream (FCS). In most implementations, the D-A coefficients are obtained by taking the second derivative of the FCS. The second derivative operation, on the piece-wise linear coefficient stream, forces most of the D-A coefficients to zero. The remaining non-zero terms are "small" numbers compared to the original coefficients. Once ascertained, the non-zero D-A coefficients are used to weight the input data samples.

The weighting technique can be accomplished by multiplying each D-A coefficient by a separate input sample. Note that, in accordance with the present invention, each sample is read R times, where R>1, before the next sample is read to implement an R:1 interpolation as was discussed above. The products are then summed together along with the result of a previous multiplication of the same D-A coefficients with different input data samples. This first sum is added to another number to form a second sum. The other number is the previous value of the second sum. The second sum is the result. The resultant output data stream is exactly the same as the conventional method would compute.

Such a double-accumulator can be implemented in a variety of circuits. For example, a register-based double accumulator may be implemented using a shift register to sequentially move input data across the inputs to a plurality of multipliers. The multipliers are used to multiply the input data by selected D-A coefficients. The products are summed together and provided to a first accumulator. The first accumulator provides its output to the input of a second accumulator. The second accumulator provides the result.

This particular double accumulator implementation is, as discussed above, deployed in a RAM-based convolver. The RAM 222 holds the data samples and D-A coefficients. An address generator (not shown) directs the RAM 222 to provide appropriate pairs of input data samples and D-A coefficients. These pairs are provided to a multiply-accumulator. The output of the multiply-accumulator is coupled to a conventional accumulator. The output of the conventional accumulator is the result. Note that other implementations may employ other types of memory that may buffer the data samples.

A D-A convolver circuit is constructed using coefficients that are derived from the filter coefficient stream (FCS). These coefficients are referred to as "D-A coefficients. Referring to FIG. 1(*a*), an example of a FCS is shown plotted on a graph as the numerical series 1,2,3,2,1 formed from two piece-wise linear segments. This short series is chosen to keep the example simple and should not be viewed as a limit on the D-A method. Note that a similar sequence 1,2,3,4,5, . . . , 5,4,3,2,1 is also formed from two piece-wise linear segments and will yield the same number of non-zero D-A coefficients (three) regardless of the number of original terms. The conventional approach would contain one multiplier-summer per each original term, not three as in the D-A method.

Figure 14:
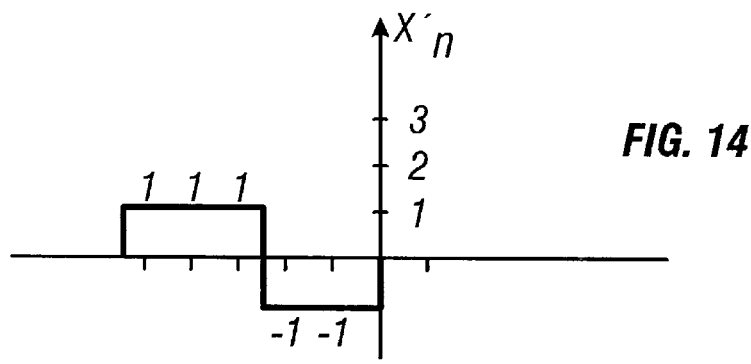
FIGS. 14–15 graph the respective first and second derivatives of the FCS represented by FIG. 8 and used in accordance with the principles of the present invention.

The D-A coefficients are preferably ascertained from the second derivative of the FCS. Referring to FIG. 14, the graph shows the first derivative of the FCS in FIG. 13. Generally, the first derivative is found by Equation 2:

$$X'_n = (\Delta x_n)/(\Delta t) = x_n - x_{n+1}$$

Figure 15:
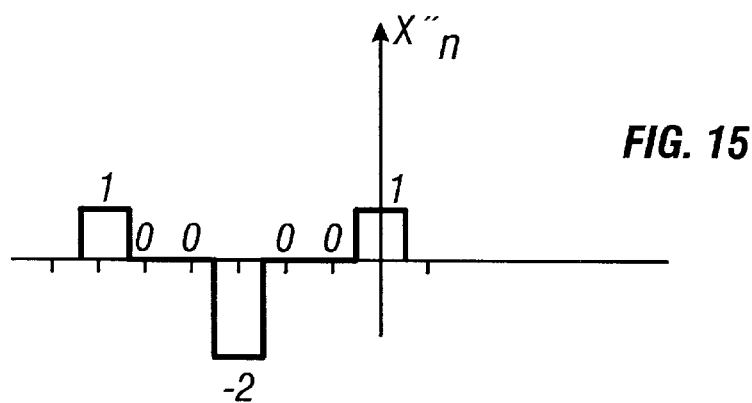

FIG. 15 shows the second derivative of the FCS. Generally, the second derivative can be found by equation (3):

$$X''_n = (\Delta x_n')/(\Delta t') = x'_n - x''_{n+1}$$

Figure 16:
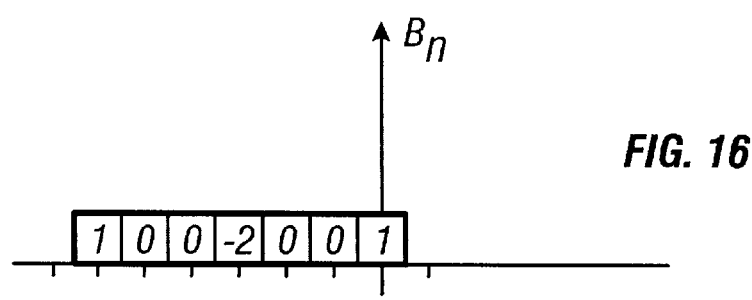
FIG. 16 illustrates a set of D-A coefficients, obtained in accordance with the present invention by taking the second derivative of the filter coefficient stream of FIG. 8 against the axis $B_n$.

The resulting values are the D-A coefficients. FIG. 16 shows the resulting D-A coefficients against the axis $B_n$. In the D-A circuitry, the input sample stream will be weighted, preferably multiplied, by these coefficients. Since most of the coefficients are zeros, the D-A circuitry requires only a few multipliers.

D-A coefficients are readily ascertained from most any function expressed as a series of line segments. One D-A coefficient is designated for each point where two line segments meet. The value of a D-A coefficient is equal to the change in slope (second derivative) from the first line segment to the second. Examples of this method are shown in FIGS. 7(*a*)–7(*c*).

Figure 17:
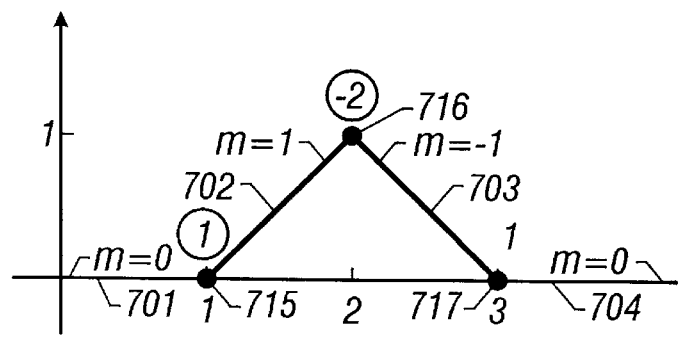
FIGS. 17–19 illustrate a series of line segments representing examples of input function from which the D-A coefficients are ascertained for use in connection with the present invention.

Referring first to FIG. 17, all line segment slopes are indicated by "m=" and all D-A coefficients are circled. Specifically, FIG. 17 shows line segment 701 with slope m=0 adjoining to line segment 702 having slope m=1. Therefore, the D-A coefficient at point 715 is "1" (1−0). FIG. 17 also shows line segment 702 with slope m=1 adjoining to line segment 703 having slope m=−1. Therefore, the D-A coefficient at point 716 is "−2" ((−1) −1). In addition, FIG. 17 shows line segment 703 with slope m=−1 adjoining to line segment 704 having slope m=0. Therefore, the D-A coefficient at point 717 is "1" (0−(−1)).

Figure 18:
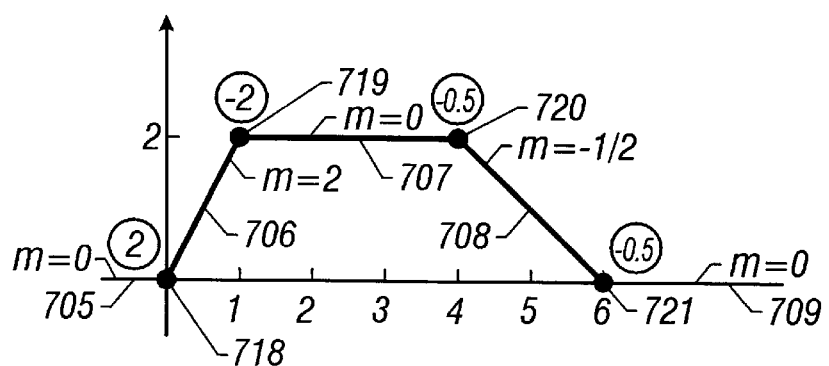

FIG. 18 shows line segment 705 with slope m=0 adjoining to line segment 706 having slope m=2. Therefore, the D-A coefficient at point 718 is "2" (2−0). FIG. 18 also shows line segment 706 with slope m=2 adjoining to line segment 707 having slope m=0. Therefore, the D-A coefficient at point 719 is "−2" (0−2). In addition, FIG. 18 shows line segment 707 with slope m=0 adjoining to line segment 708 having slope m=(−0.5). Therefore, the D-A coefficient at point 720 is "−0.5" ((−0.5)−0). FIG. 18 shows line segment 708 with slope m=(−0.5) adjoining to line segment 709 having slope m=0. Therefore, the D-A coefficient at point 721 is "0.5" (0−(−0.5)).

Figure 19:
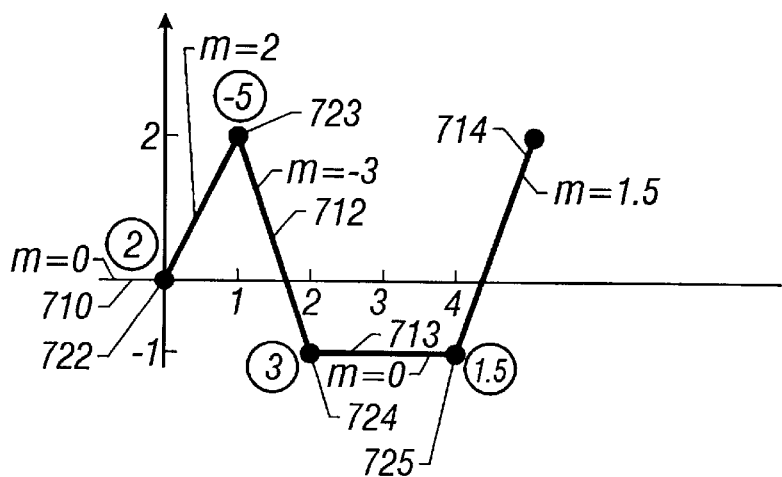

FIG. 19 shows line segment 710 with slope m=0 adjoining to line segment 711 having slope m=2. Therefore, the D-A coefficient at point 718 is "2" (2−0). FIG. 19 also shows line segment 711 with slope m=2 adjoining to line segment 712 having slope m=(−3). Therefore, the D-A coefficient at point 723 is "−5" ((−3)−2). In addition, FIG. 19 shows line segment 712 with slope m=(−3) adjoining to line segment 713 having slope m=0. Therefore, the D-A coefficient at point 724 is "3" (0−(−3)). Lastly, FIG. 19 shows line segment 713 with slope m=32 (0) adjoining to line segment 714 having slope m=1.5. Therefore, the D-A coefficient at point 725 is "1.5" (1.5−0).

Figure 13:
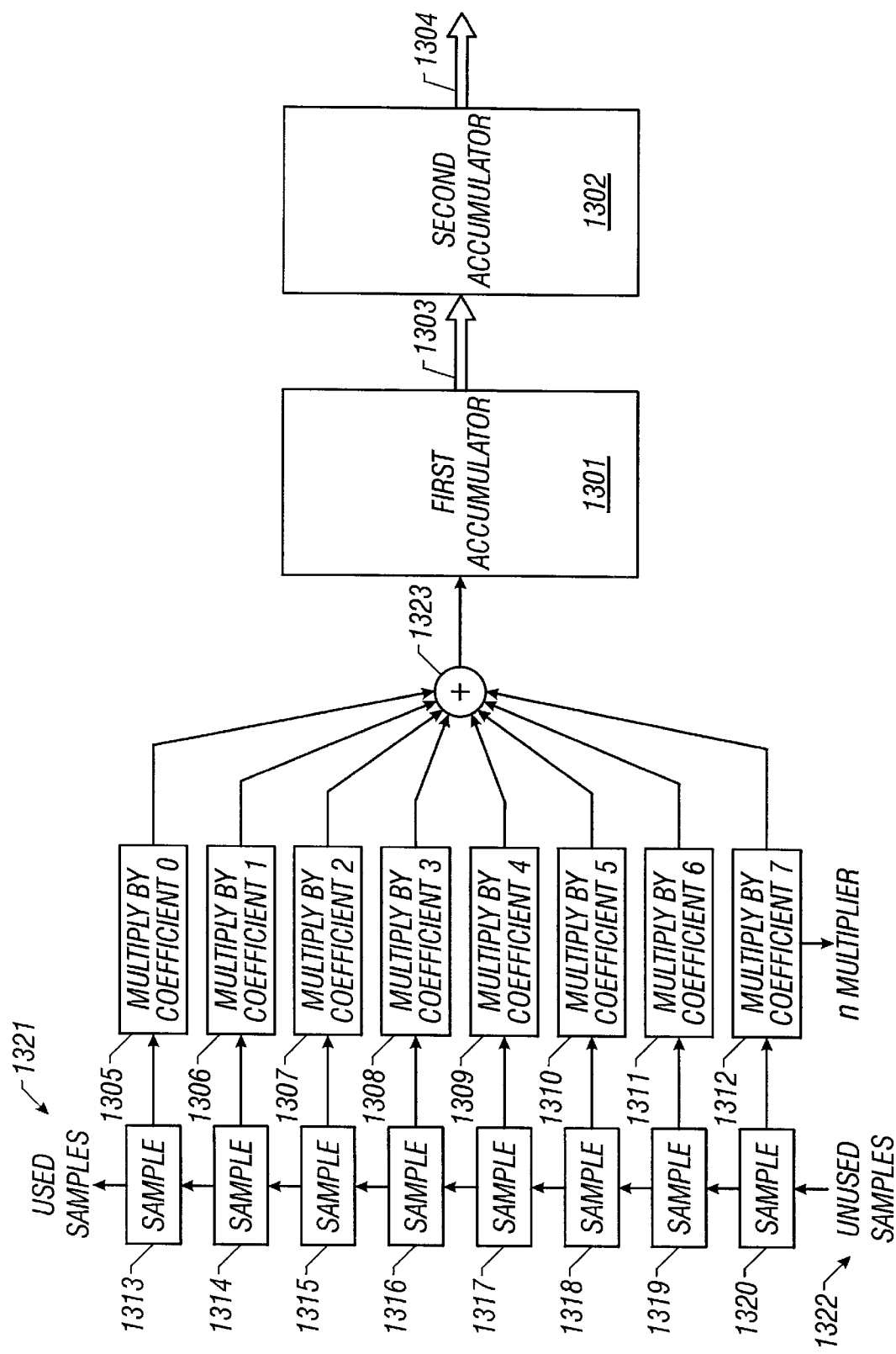
FIG. 13 is a block diagram of a D-A convolver circuit, according to the present invention.

A block representation of the D-A convolver implementation is shown in FIG. 13. Multipliers 1305 through 1312 are used to multiply input sample values by the ascertained D-A coefficient values. Depending upon the FCS, more or less multipliers may be used. The products from the multipliers 1305–1312 are added together by adder 1323. The sum is fed to the first accumulator 1301, which accumulates a running summation of sequential outputs from the adder 1323 as each sample is processed. The result 1303 from the first accumulator 1301 is fed to the second accumulator 1302, which accumulates a running summation of sequential outputs from the accumulator 1301 as each sample is processed. The result from the second accumulator 1302 is the result of the convolution (or the filtered signal value) 1304.

Figure 20:
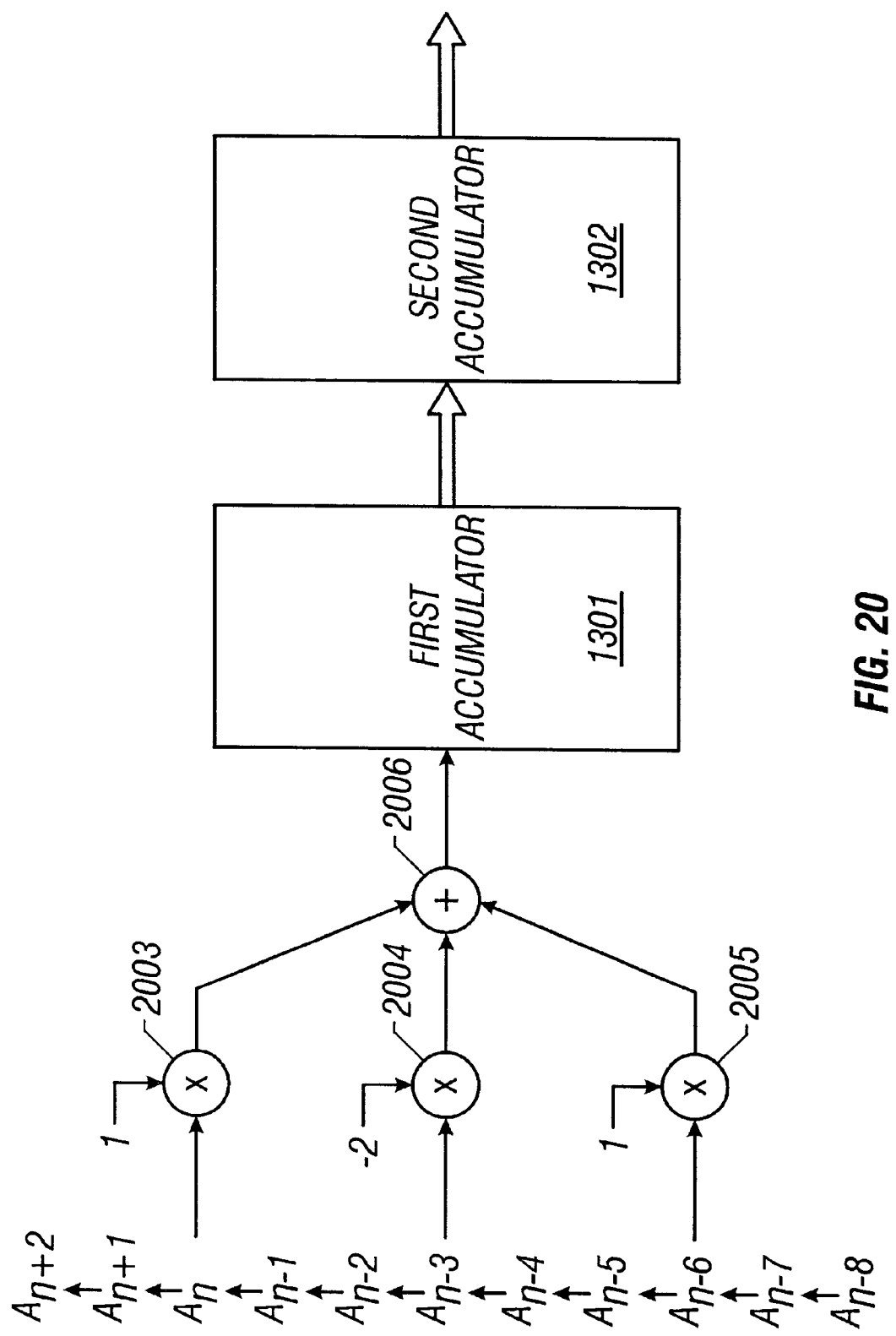
FIG. 20 is a block diagram of a simplified D-A convolver circuit after elimination of the "zero" terms, also according to the present invention, and tailored for the FCS of FIG. 8.

Using the example from FIGS. 13 and 14 (discussed above), the circuitry would require only 3 multipliers. This is because 5 of the D-A coefficients are zeros (see FIG. 16). FIG. 20 shows a circuit implementation more tailored to the example of FIGS. 1 and 2. Referring to FIG. 20, the input values (samples) are designated by A n−1. These samples are multiplied by D-A coefficients in multipliers 1403, 1404, and 1405. The multipliers 1403–1405 feed a summer 1406 which sums the three products. The summer feeds the first accumulator 1301. The first accumulator 1301 feeds the second accumulator 1302. The second accumulator 1302 yields the result of the convolution (or a filtered signal). The first accumulator 1301 and the second accumulator 1302 operate in the same manner as described in connection with the accumulator 1301 and 1302 of FIG. 13.

Referring now to FIG. 20, the input values (samples, $A_{n-t}$) are weighted (multiplied) by the non-zero D-A coefficients from FIG. 16. Specifically, sample $A_{n-6}$ represents the most-recently input data sample and is fed into a multiplier 1403 to be multiplied by the D-A coefficient "1", which corresponds to the right most D-A coefficient "1" in FIG. 16. $A_{n-3}$ is a sample taken three samples before $A_{n-6}$. $A_{n-3}$ is fed into multiplier 1404 to be multiplied by the D-A coefficient "−2"; this "−2" corresponds to the "−2" D-A coefficient from FIG. 16. An is a sample taken 6 samples before sample $A_{n-6}$. An is fed into multiplier 1405 to be multiplied by the D-A coefficient "1" this "1" corresponds to the left most D-A coefficient in FIG. 16. The two sample spaces between $A_n$ and $A_{n-3}$ correspond to the two "0" spaces between D-A coefficients "1" and "−2" in FIG. 16. Similarly, the two sample spaces between $A_{n-3}$ and $A_{n-6}$ correspond to the two "0" spaces between D-A coefficients "−2" and "1" in FIG. 16.

FIG. 27 shows the circuitry comprising an accumulator (e.g., 1301 or 1302 of FIG. 20). The input to the accumulator enters a summer 803. The output of the summer 803 is stored in a memory file 801. The memory file 801 may comprise nearly any re-writable memory mechanism such as a DRAM, a register file, flip-flops, latches, etc. The output of the memory file 801 provides the second input to the summer 803 via line 802 and provides the output of the accumulator.

Figure 21:
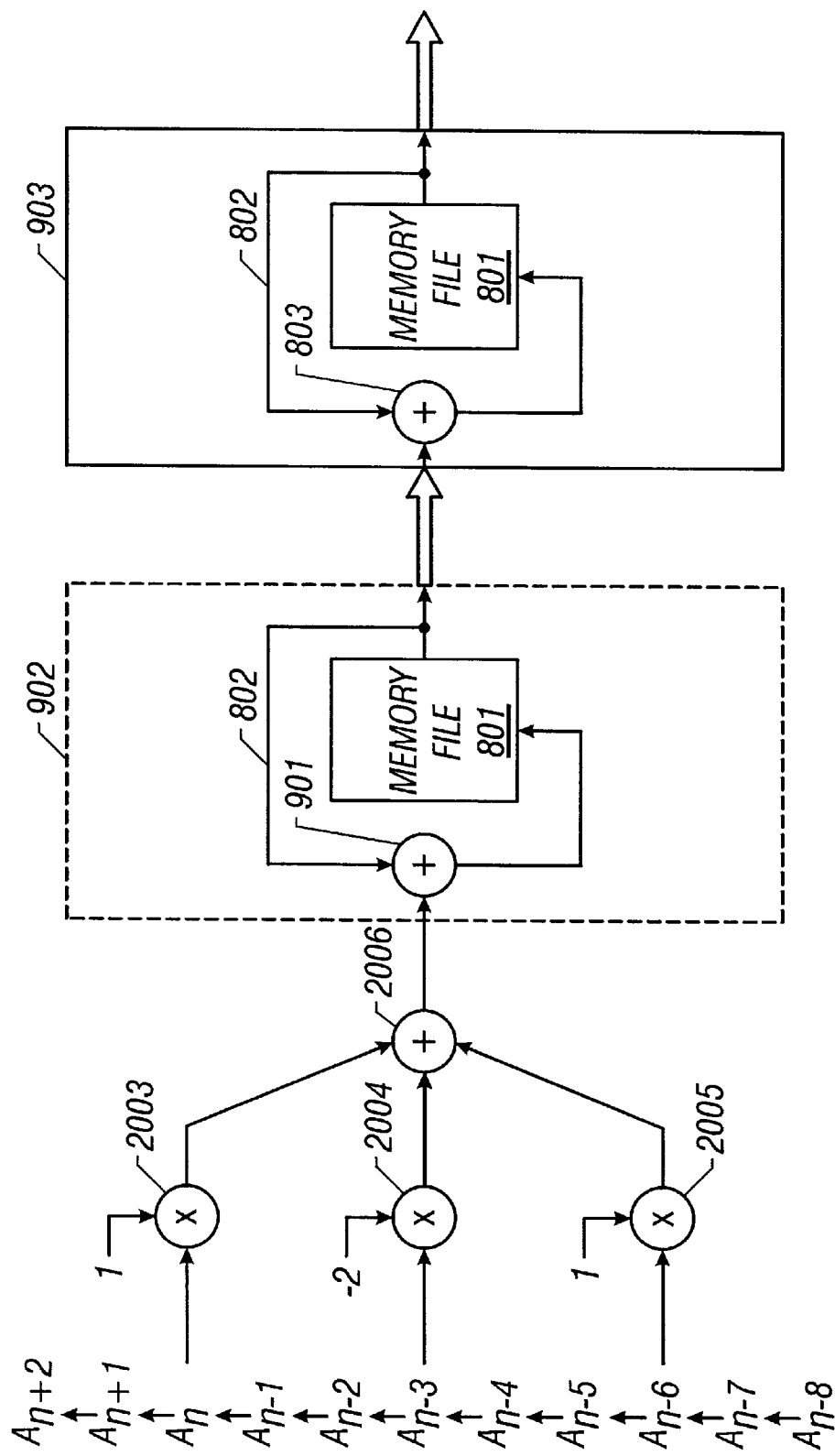
FIG. 21 diagrams, according to the present invention, illustrating a D-A circuit implementation tailored for the FCS of FIGS. 8 and 16.

FIG. 21 shows a D-A circuit tailored to the example of FIGS. 13 and 14, including detailed diagrams of the accumulators 902 and 903, which are identical to the accumulator of FIG. 27. Alternatively, the summers 901 and 1406 may be consolidated as shown in FIG. 22.

Figure 22:
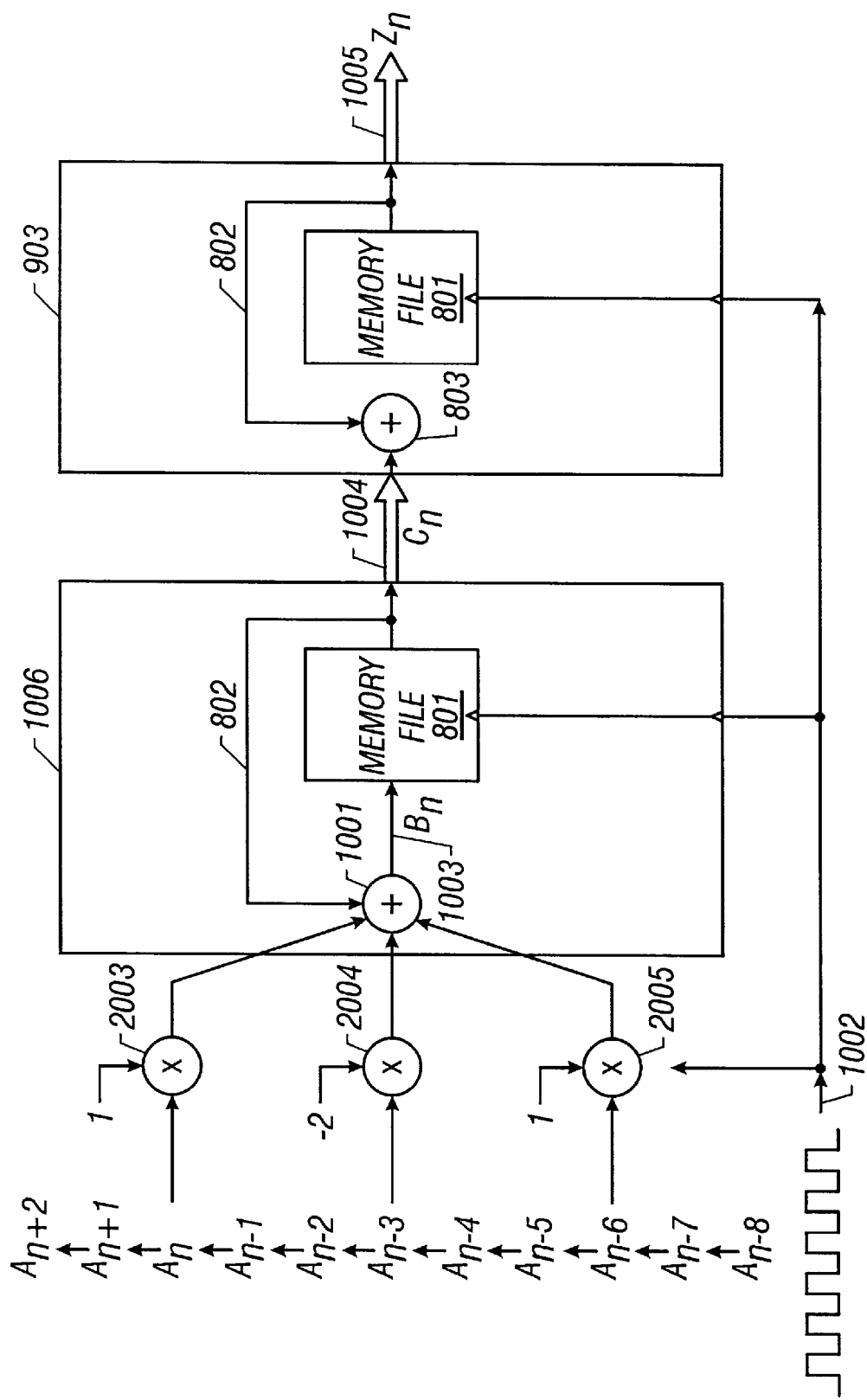
FIG. 22 diagrams a full D-A circuit, in accordance with the present invention.

FIG. 22 shows a complete D-A circuit including three multipliers 1403, 1404 and 1405, and a pair of accumulators 2206 and 903 arranged for performing the convolution of the functions discussed and illustrated in connection with FIGS. 13 and 14. A clock line 2202 is used to store and release data from the memory file 801 and to advance the input data to be convolved. The circuit of FIG. 22 can now perform the convolution of FIG. 13 and 14 with only three multiplies per convolution result ($Z_n$). The conventional method requires five multipliers. For longer convolver streams, the savings is greater.

As an example for a specific DSP application concerning a LASER radar, the clock line 2202 provides a clock at a rate of 83.3 MHz, with a D-A coefficient designated for the input function every 4 nanoseconds.

While three multipliers 1403, 1404 and 1405 are shown, the multipliers 1403 and 1404 are unnecessary and can be bypassed because they are arranged to multiply by one. Moreover, a register performing a simple binary shift operation can replace the multiplier 1404 because its function, multiplying by a factor of two, is effected by a single binary shift. Such circuitry reduction is common, expected and considered to be understood in the illustrated embodiments herein because, by their nature, D-A coefficients are generally small numbers.

FIGS. 11a and 11b illustrate the mathematics of these computations provided by the convolution result ($Z_n$) of FIG. 22. The data to be convolved is shown along the top horizontal axis of the table of FIG. 23, and the left vertical axis illustrates the convolving coefficients which are effectively slid across the data. At each sample time, the data values are read, multiplied by the D-A coefficients, summed, and double accumulated, as previously discussed. Note that the results are the same as the conventional implementation of FIG. 11.

Figure 23:
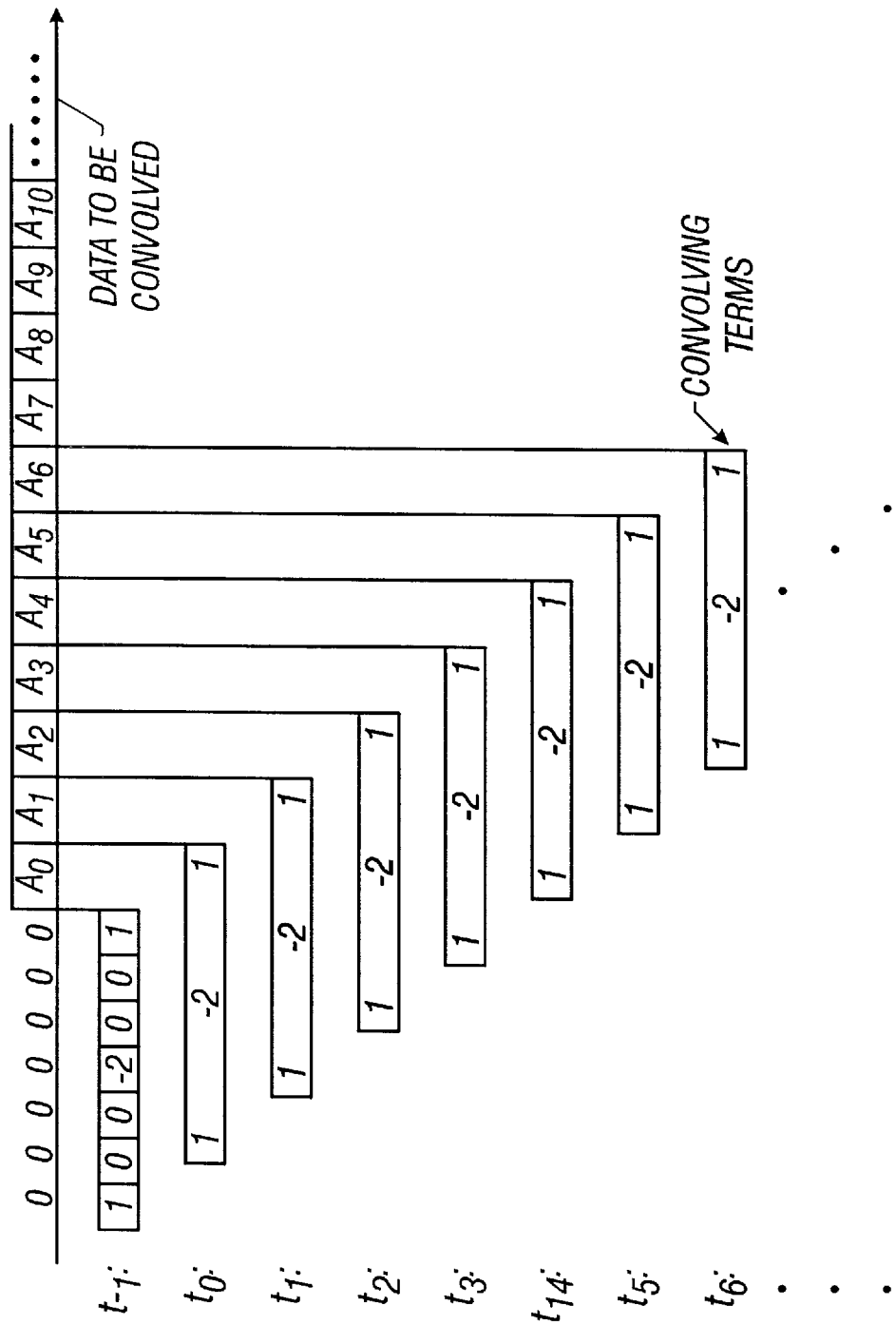
FIG. 23 is a table illustrating a process for performing the computations associated with the derivation of the D-A coefficients for the FCS of FIG. 8.

Referring to FIG. 23, since most of the D-A coefficients are equal to zero and two of the coefficients are equal to one, far less multiplies are necessary.

In FIG. 24, a table shows the results of the convolution performed by the D-A circuit of FIG. 22. In FIGS. 22–23: "n" is the sample count; "$B_n$," 2203 is the output of summer 2201 for the sample count given by "n"; "$C_n$," is the output of the first accumulator 2206 for the sample count given by "n"; and "$Z_n$," is the convolution result at the time of the sample count "n".

Figure 25:
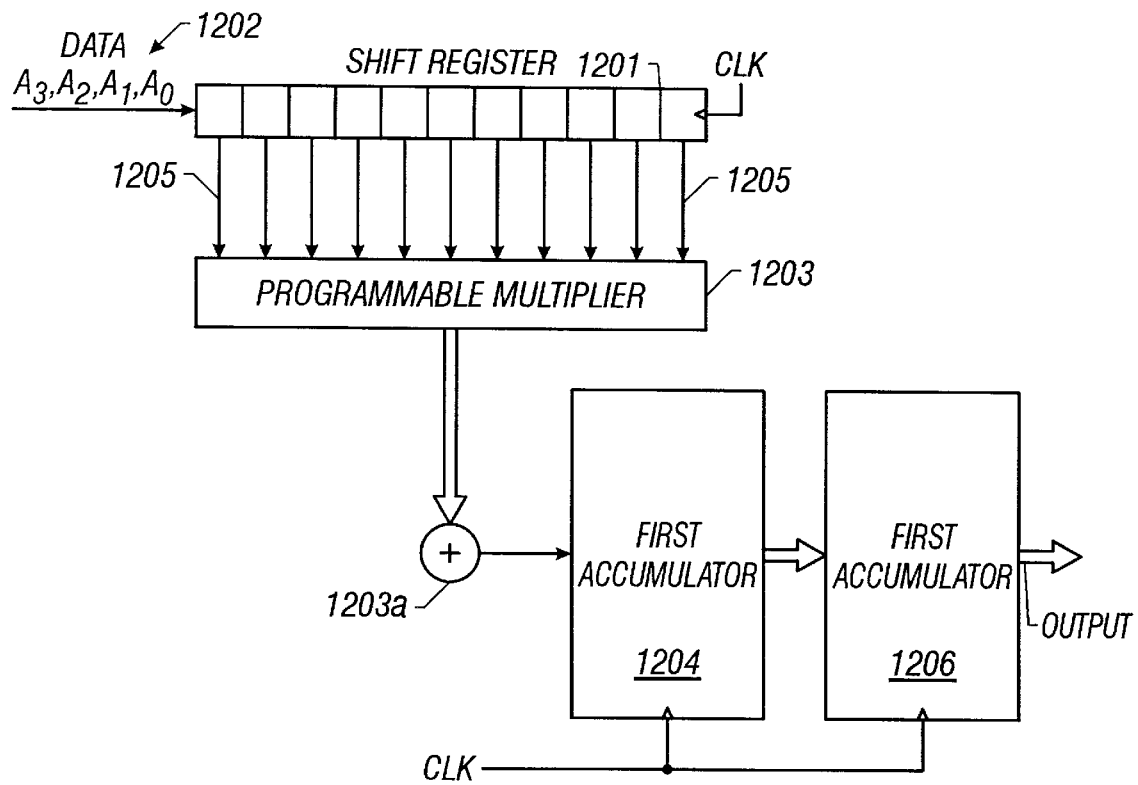
FIG. 25 diagrams a software-programmable, shift-register implementation of a D-A convolving method provided by the present invention.

The present invention can be implemented using a variety of different circuits or software (including firmware) implementations. FIG. 25 shows a software programmable, shift register implementation of the D-A convolving method. Data samples 2502 are shifted into a shift register 2501. Each stage of the shift register 2501 has an output 2505 that enters a programmable multiplier 2503. The programmable multiplier 2503 selects which outputs 2505 to use and how to weight each of the selected outputs. Using the example of FIGS. 8 and 16, the multiplier 2503 uses only the first, third and sixth stages of the shift register 2501. Using the D-A coefficients from FIG. 2, the first stage is weighted by 1, the third stage is weighted by (−2), and the sixth stage is weighted by 1. The products from the multiplier 2503 are fed to a summer 2503a. The summer 2503a feeds the first accumulator 2504. The first accumulator 2504 feeds the second accumulator 2506. And finally, the result is output from the second accumulator 2506.

Figure 26:
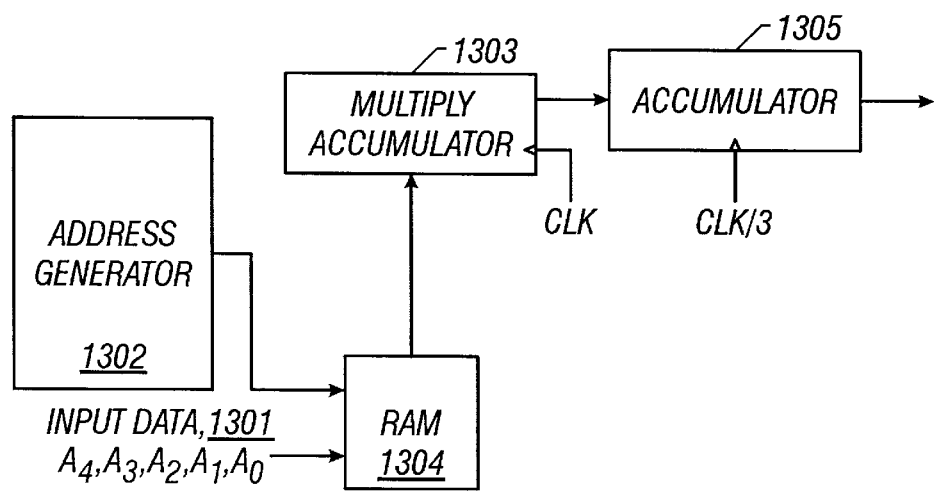
FIG. 26 diagrams a D-A convolver implemented in a RAM-based circuit.

The invention is also useful in a RAM-based convolver. FIG. 26 shows the D-A convolver implemented in the hardware or software RAM-based matching filter. RAM memory 2604 holds input data 2601 and D-A coefficients (1, −2) and 1, from the example of FIG. 16). Each clock cycle, multiply-accumulator 2603 multiplies a single D-A coefficient by a single data sample. Address generator 2602 is responsible for sequencing the correct order of data samples and D-A coefficients into multiplier-accumulator 2603. The output of multiply-accumulator 2603 feeds accumulator 2605. The accumulator 2605 is clocked at a fraction of the system clock rate (in the case of the example from FIGS. 1 and 2, the accumulator clock is a third of the system clock). The fraction is equal to (1/(number of D-A coefficients)). This allows the accumulator 2605 to receive and sum, over 3 system clock cycles, the same three data points that accumulator 903 would receive and sum over a single clock cycle.

The particular embodiments disclosed above are illustrative only, as the invention may be modified and practiced in different but equivalent manners apparent to those skilled in the art having the benefit of the teachings herein. For instance, some variations of the implementation in FIGS. 6–7 may implement the buffer 314, buffer 222, the convolution circuit 224, and peak detector circuit 326 in a single, application specific integrated circuit ("ASIC"). Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for obtaining an indication of range from a first object to a second object, the method comprising:

transmitting a signal from the first object;

receiving the signal reflected from the second object;

digitizing the received signal into a plurality of samples;

buffering the samples;

repeatedly convolving each one of at least a portion of the buffered samples R times, wherein R>1; and detecting a time of the received signal's center of energy from the convolution results, so that the time of the received signal's center of energy is an indication of the range from the first object to the second object.

2. The method of claim 1, wherein buffering the samples includes storing the samples to a memory device.

3. The method of claim 2, wherein:

buffering the samples includes storing the samples to the memory device at a first rate; and repeatedly convolving each one of the at least a portion of the buffered samples includes reading the samples from the memory device at a second rate.

4. The method of claim 1, wherein transmitting the signal includes transmitting a LADAR signal.

5. The method of claim 4, wherein transmitting the LADAR signal includes transmitting a split-beam LADAR signal.

6. The method of claim 1, further comprising windowing the received signal before digitizing the received signal.

7. The method of claim 6, wherein windowing the received signal includes:
identifying a window of time in which a return pulse in the received signal is expected to be found; and
locking onto the identified window of time.

8. The method of claim 6, wherein windowing the received signal includes identifying the presence and location of a return pulse in the received signal while the received signal is digitized.

9. The method of claim 6, wherein windowing the received signal includes delaying the buffering of samples until a return pulse is identified in the received signal.

10. The method of claim 1, wherein repeatedly convolving each one of the at least a portion of the buffered samples R times includes:
sequentially multiplying each of the at least a portion of the buffered samples by an equal number of predetermined coefficients to produce an equal number of products;
sequentially summing the products;
storing the sequential sum in a first accumulator;
outputting the sequential sum as it accumulates and is stored in the first memory to a second accumulator; and
sequentially summing the sequential sum outputs of the first accumulator.

11. A method for detecting when a pulse occurs in a signal, comprising:
digitizing the signal into a plurality of samples;
repeatedly convolving each one of at least a portion of the samples R times, wherein R>1; and
detecting a time of the signal's center of energy from the convolution results, so that the time of the signal's center of energy indicates when the pulse occurs in the signal.

12. The method of claim 11, further comprising buffering the samples.

13. The method of claim 12, wherein buffering the samples includes storing the samples to a memory device.

14. The method of claim 13, wherein:
buffering the samples includes storing the samples to the memory device at a first rate; and
repeatedly convolving each one of the at least a portion of the buffered samples includes reading the samples from the memory device at a second rate.

15. The method of claim 11, further comprising windowing the signal before digitizing the signal.

16. The method of claim 15, wherein windowing the signal includes:
identifying a window of time in which the pulse is expected to occur in the signal, and
locking on to the identified widow of time.

17. The method of claim 15, wherein windowing the signal includes identifying the presence and location of the pulse in the signal while the signal is digitized.

18. The method of claim 15, wherein windowing the signal includes delaying a buffering of the samples until the pulse is identified in the signal.

19. The method of claim 11, wherein repeatedly convolving each one of the at least a portion of the samples R times includes:
sequentially multiplying each of the at least a portion of the samples by an equal number of predetermined coefficients to produce an equal number of products;
sequentially summing the products;
storing the sequential sum in a first accumulator;
outputting the sequential sum as it accumulates and is stored in the first memory to a second accumulator; and
sequentially summing the sequential sum outputs of the first accumulator.

20. An apparatus for obtaining an indication of range from a first object to a second object, the apparatus comprising:
a transmitter capable of transmitting a signal from the first object;
a receiver capable of receiving a signal transmitted by the signal transmitter and reflected by the second object;
an analog-to-digital converter capable of digitizing the received signal to produce a plurality of samples;
a convolution circuit including a matched filter for convolving the digitized samples;
a buffer capable of storing the samples and serially outputting at least a portion of the samples, each sample of said portion of the samples being output R times, where R>1, to the convolution circuit; for convolving said each sample of said portion of the samples R times, and
a detector for detecting a time of the received signal's center of energy from the output of the convolution circuit, so that the time of the received signal's center of energy is an indication of the range from the first object to the second object.

21. The apparatus of claim 20, wherein the transmitter and the receiver comprise a transceiver.

22. The apparatus of claim 20, wherein the transmitter includes:
a solid state laser capable of emitting a beam of laser light energy;
a diode laser capable of pumping the solid state laser;
a beam expander for expanding the beam;
a beam segmenter for splitting the expanded beam; and
a lens structure.

23. The apparatus of claim 20, wherein the receiver includes:
a telescope;
a set of collection optics capable of collecting laser light energy received through the telescope;
a set of condensing optics capable of condensing the collected laser light energy, and
a detection array capable of detecting the condensed laser light energy.

24. The apparatus of claim 20, wherein the matched filter includes:
a plurality of multipliers, each of the multipliers having an input and an output, and each multiplier being configured to multiply an input data sample by a derived double-accumulator coefficient;
a first accumulator capable of receiving the outputs of the multipliers; and
a second accumulator capable of receiving an output from the first accumulator.

25. The apparatus of claim 24, wherein the matched filter further includes a shift register for sequentially receiving input data samples and for providing the input data samples to the inputs of the multipliers.

26. The apparatus of claim 20, wherein the convolution circuit includes:
a multiply-accumulator for multiplying a coefficient by an input data sample, the multiply-accumulator having a plurality of inputs and an output;

a buffer for holding said coefficient and input data samples, the buffer having an input to receive said input data samples, an output for providing the coefficient and the input data samples to the multiply-accumulator, and an input to receive address information for determining what information to place on said output;

an address generator having an output for providing information to the buffer; and an accumulator having an input for receiving the output of the multiply-accumulator and an output for providing a result.

27. An apparatus for obtaining an indication of range from a first object to a second object, the apparatus comprising:

means for transmitting a signal from the first object;

means for receiving a signal transmitted by the signal transmitter and reflected by the second object;

means for digitizing the received signal to produce a plurality of samples;

means for convolving the digitized samples;

means for storing the samples and serially outputting at least a portion of the samples, each sample of said portion of the samples being output R times, where R>1, to the convolution circuit for convolving said each sample of said portion of the samples R times; and means for detecting a time of the received signal's center of energy from the output of the means for convolving the digitized samples, so that the time of the received signal's center of energy is an indication of the range from the first object to the second object.

28. The apparatus of claim 27, wherein the means for transmitting and the means for receiving comprise a transceiver.

29. The apparatus of claim 27, wherein the transmitter includes:

a solid state laser capable of emitting a beam of laser light energy;

a diode laser capable of pumping the solid state laser;

a beam expander for expanding the beam;

a beam segmenter for splitting the expanded beam; and a lens structure.

30. The apparatus of claim 27, wherein the receiver includes:

a telescope;

a set of collection optics capable of collecting laser light energy received through the telescope;

a set of condensing optics capable of condensing the collected laser light energy, and a detection array capable of detecting the condensed laser light energy.

31. The apparatus of claim 27, wherein the means for convolving includes:

a plurality of multipliers, each of the multipliers having an input and an output, and each multiplier being configured to multiply an input data sample by a derived double-accumulator coefficient;

a first accumulator capable of receiving the outputs of the multipliers; and a second accumulator capable of receiving an output from the first accumulator.

32. The apparatus of claim 31, wherein the means for convolving further includes a shift register for sequentially receiving input data samples and for providing the input data samples to the inputs of the multipliers.

33. The apparatus of claim 27, wherein the means for storing the samples includes a random access memory.

34. An apparatus for processing a digitized signal in a LADAR system, the digitized signal representing a reflection of a laser beam from an object, the apparatus comprising:

a convolution circuit, including:

a linearizing circuit;

a matched filter capable of convolving the digitized signal at a resolution greater than that at which the digitized signal was digitized; and a buffer capable of storing samples of the digitized signal and serially outputting at least a portion of the samples, each sample of said portion of the samples being output R times, where R>1, to the convolution circuit for convolving said each sample of said portion of the samples R times.

35. The apparatus of claim 34, wherein the matched filter includes:

a plurality of multipliers, each of the multipliers having an input and an output, and each multiplier being configured to multiply an input data sample by a derived double-accumulator coefficient;

a first accumulator capable of receiving the outputs of the multipliers; and a second accumulator capable of receiving an output from the first accumulator.

36. The apparatus of claim 35, wherein the matched filter further includes a shift register for sequentially receiving input data samples and for providing the input data samples to the inputs of the multipliers.

* * * * *